(12) United States Patent
Mukherjee et al.

(10) Patent No.: US 10,271,325 B2
(45) Date of Patent: Apr. 23, 2019

(54) CHANNEL ACCESS IN LISTEN BEFORE TALK SYSTEMS

(71) Applicant: Telefonaktiebolaget L M Ericsson (publ), Stockholm (SE)

(72) Inventors: Amitav Mukherjee, Santa Clara, CA (US); Jung-Fu Cheng, Fremont, CA (US); Sorour Falahati, Stockholm (SE); Du Ho Kang, Sollentuna (SE); Havish Koorapaty, Saratoga, CA (US); Daniel Larsson, Vallentuna (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 14/942,690

(22) Filed: Nov. 16, 2015

(65) Prior Publication Data

US 2016/0143014 A1    May 19, 2016

Related U.S. Application Data

(60) Provisional application No. 62/080,877, filed on Nov. 17, 2014.

(51) Int. Cl.
*H04W 72/04* (2009.01)
*H04L 5/00* (2006.01)
*H04W 74/08* (2009.01)

(52) U.S. Cl.
CPC ......... *H04W 72/044* (2013.01); *H04L 5/0007* (2013.01); *H04L 5/0039* (2013.01); *H04W 74/0816* (2013.01)

(58) Field of Classification Search
CPC ............ H04W 72/044; H04W 74/0816; H04L 5/0007; H04L 5/0039
See application file for complete search history.

(56) References Cited

U.S. PATENT DOCUMENTS

| 8,774,209 B2 | 7/2014 | Sadek et al. | |
| 2015/0373741 A1* | 12/2015 | Yerramalli, Sr. | ..... H04W 24/08 370/336 |
| 2016/0135189 A1* | 5/2016 | Chandrasekhar | .......................... H04W 72/0453 370/329 |

OTHER PUBLICATIONS

Author Unknown, "Broadband Radio Access Networks (BRAN); 5 GHz high performance RLAN; Harmonized EN covering the essential requirements of article 3.2 of the R&TTE Directive," Harmonized European Standard 301.893, Version 1.7.1, European Telecommunications Standards Institute, Jun. 2012, 90 pages.

(Continued)

*Primary Examiner* — Siming Liu
(74) *Attorney, Agent, or Firm* — Withrow & Terranova, PLLC

(57) ABSTRACT

Systems and methods relating to Listen before Talk (LBT) procedures suitable for, e.g., License Assisted Access (LAA) to an unlicensed frequency spectrum or Long Term Evolution Unlicensed (LTE-U) are disclosed. In some embodiments, a method of operation of a node of a cellular communications network comprises performing a LBT procedure for an observed channel in an unlicensed frequency spectrum. The LBT procedure defers at least one Clear Channel Assessment (CCA) slot such that the LBT procedure concludes at or near a desired starting point for a transmission. The at least one CCA slot comprises at least one of a first CCA slot of the LBT procedure, one or more intermediate CCA slots of the LBT procedure, and a final CCA slot of the LBT procedure. The method further comprises performing the transmission on the observed channel upon completion of the LBT procedure.

35 Claims, 26 Drawing Sheets

(56) References Cited

OTHER PUBLICATIONS

Author Unknown, "Technical Specification Group Radio Access Network; Evolved Universal Terrestrial Radio Access (E-UTRA); Physical channels and modulation (Release 11)," Technical Specification 36.211, Version 11.4.0, 3GPP Organizational Partners, Sep. 2013, 120 pages.
Author Unknown, "Technical Specification Group Radio Access Network; Evolved Universal Terrestrial Radio Access (E-UTRA); Multiplexing and channel coding (Release 12)," Technical Specification 36.212, Version 12.2.0, 3GPP Organizational Partners, Sep. 2014, 89 pages.
Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
Beluri, Mihaela, et al., "Mechanisms for LTE Coexistence in TV White Space," IEEE International Symposium on Dynamic Spectrum Access Networks (DYSPAN), Oct. 16-19, 2012, Bellevue, Washington, IEEE, pp. 1-10.
Ericsson, "R1-145193: Details of Listen-Before-Talk for LAA," 3rd Generation Partnership Project (3GPP), TSG RAN WG1 Meeting #79, Nov. 17-21, 2014, 7 pages, San Francisco, USA.
Nokia Corporation, et al., "R1-144183: Channel Access Mechanisms according to ETSI regulations," 3rd Generation Partnership Project (3GPP), TSG RAN WG1 Meeting #78bis, Oct. 6-10, 2014, 5 pages, Ljubljana, Slovenia.
Nokia Networks, et al., "R1-144187: Listen Before Talk and Channel Access," 3rd Generation Partnership Project (3GPP), TSG RAN WG1 Meeting #78bis, Oct. 6-10, 2014, 5 pages, Ljubljana, Slovenia.
Qualcomm Incorporated, "R1-143999: Required functionalities and design targets," 3rd Generation Partnership Project (3GPP), TSG RAN WG1 #78bis, Oct. 6-10, 2014, 4 pages, Ljubljana, Slovenia.
International Search Report and Written Opinion for International Patent Application No. PCT/IB2015/058892, dated Feb. 12, 2016, 14 pages.

* cited by examiner

CHANNEL ACCESS IN LISTEN BEFORE TALK SYSTEMS

RELATED APPLICATIONS

This application claims the benefit of provisional patent application Ser. No. 62/080,877, filed Nov. 17, 2014, the disclosure of which is hereby incorporated herein by reference in its entirety.

TECHNICAL FIELD

This disclosure pertains to channel access in Listen-Before-Talk (LBT) systems.

BACKGROUND

Long Term Evolution (LTE)

Third Generation Partnership Project (3GPP) Long Term Evolution (LTE) uses Orthogonal Frequency Division Multiplexing (OFDM) in the downlink and Discrete Fourier Transform (DFT)-spread OFDM (also referred to as Single-Carrier Frequency Division Multiple Access (SC-FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 milliseconds (ms), each radio frame consisting of ten equally-sized subframes of length $T_{subframe}$=1 ms as shown in FIG. 2. For a normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., the base station transmits control information in each subframe about which terminal's data is transmitted to and upon which resource blocks the data is transmitted in the current subframe. This control signaling is typically transmitted in the first 1, 2, 3, or 4 OFDM symbols in each subframe, and the number n=1, 2, 3, or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. The reference symbols shown in FIG. 3 are the Cell Specific Reference symbols (CRS) and are used to support multiple functions including fine time and frequency synchronization, and channel estimation for certain transmission modes.

Physical Downlink Control Channel (PDCCH) and Enhanced PDCCH (EPDCCH)

From LTE Release 11 (Rel-11) onwards, the above described resource assignments can also be scheduled on the Enhanced Physical Downlink Control Channel (EPDCCH). For Release 8 (Rel-8) to Release 10 (Rel-10), only Physical Downlink Control Channel (PDCCH) is available.

The PDCCH/EPDCCH is used to carry Downlink Control Information (DCI) such as scheduling decisions and power-control commands. More specifically, the DCI includes:

downlink scheduling assignments, including Physical Downlink Shared Channel (PDSCH) resource indication, transport format, hybrid-Automatic Repeat Request (ARQ) information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments;

uplink scheduling grants, including Physical Uplink Shared Channel (PUSCH) resource indication, transport format, and hybrid-ARQ-related information. An uplink scheduling grant also includes a command for power control of the PUSCH; and power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions link adaptation can be used, where the code rate of the PDCCH/EPDCCH is selected by adapting the resource usage for the PDCCH/EPDCCH to match the radio channel conditions.

Carrier Aggregation (CA)

The LTE Rel-10 standard supports bandwidths larger than 20 MHz One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CCs, where each CC has, or at least has the possibility to have, the same structure as a Rel-8 carrier. CA is illustrated in FIG. 4. A CA-capable User Equipment (UE) is assigned a Primary Cell (PCell) which is always activated, and one or more Secondary Cells (SCells) which may be activated or deactivated dynamically.

The number of aggregated CCs as well as the bandwidth of the individual CCs may be different for uplink and downlink. A symmetric configuration refers to the case where the number of CCs in downlink and uplink is the same, whereas an asymmetric configuration refers to the case where the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

In addition, a key feature of CA is the ability to perform cross-carrier scheduling. This mechanism allows a (E)PD-CCH on one CC to schedule data transmissions on another CC by means of a 3-bit Carrier Indicator Field (CIF) inserted at the beginning of the (E) PDCCH messages. For data transmissions on a given CC, a UE expects to receive scheduling messages on the (E)PDCCH on just one CC—either the same CC, or a different CC via cross-carrier scheduling. This mapping from (E)PDCCH to PDSCH is also configured semi-statically.

Wireless Local Area Network (WLAN)

In typical deployments of a Wireless Local Area Network (WLAN), Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle. When the range of several WLAN Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

A general illustration of a Listen Before Talk (LBT) mechanism is shown in FIG. 5. After a Wi-Fi station A transmits a data frame to a station B, station B shall transmit the Acknowledgement (ACK) frame back to station A with a delay of 16 µs, where this duration is referred to as the Short Inter-Frame Space (SIFS). Such an ACK frame is transmitted by station B without performing a LBT operation. To prevent another station interfering with such an ACK frame transmission, a station shall defer for a duration of 34 µs (referred to as the Distributed Inter-Frame Space (DIFS)) after the channel is observed to be occupied before assessing again whether the channel is occupied.

Therefore, a station that wishes to transmit first performs a CCA by sensing the medium for a fixed duration DIFS. If the medium is idle, then the station assumes that it may take ownership of the medium and begin a frame exchange sequence. If the medium is busy, the station waits for the medium to go idle, defers for DIFS, and waits for a further random backoff period. To further prevent a station from occupying the channel continuously and thereby prevent other stations from accessing the channel, it is required for a station wishing to transmit again after a transmission is completed to perform a random backoff.

The Point Coordination Function (PCF) Inter-Frame Space (PIFS) is used to gain priority access to the medium, and is shorter than the DIFS duration. Among other cases, it can be used by stations operating under PCF, to transmit Beacon Frames with priority. At the nominal beginning of each Contention-Free Period (CFP), the Point Coordinator (PC) shall sense the medium. When the medium is determined to be idle for one PIFS period (generally 25 µs), the PC shall transmit a Beacon frame containing the Contention Free (CF) Parameter Set element and a delivery traffic indication message element.

Load-Based CCA in Europe Regulation EN 301.893

For a device not utilizing the Wi-Fi protocol, European Telecommunications Standards Institute (ETSI) "Broadband Radio Access Networks (BRAN); 5 GHz high performance RLAN; Harmonized EN Covering the essential requirement of article 3.2 of the R&TTE Directive," EN 301.893, Version 1.7.1, June 2012 (herein referred to as "EN 301.893"), provides the following requirements and minimum behavior for the load-based clear channel assessment.

1. Before a transmission or a burst of transmissions on an operating channel, the equipment shall perform a CCA check using "energy detect." The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2. If the equipment finds an Operating Channel occupied, it shall not transmit in that channel. The equipment shall perform an extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q of EN 301.893, v. 1.7.1). The counter is decremented every time a CCA slot is considered to be "unoccupied." When the counter reaches zero, the equipment may transmit.

NOTE 1: The equipment is allowed to continue Short Control Signaling Transmissions on this channel, providing it complies with the requirements in clause 4.9.2.3 of EN 301.893, v. 1.7.1.

NOTE 2: For equipment having simultaneous transmissions on multiple (adjacent or non-adjacent) operating channels, the equipment is allowed to continue transmissions on other Operating Channels providing the CCA check did not detect any signals on those channels.

3. The total time that an equipment makes use of an Operating Channel is the Maximum Channel Occupancy Time which shall be less than (13/32)×q ms, with q as defined in point 2 above, after which the device shall perform the Extended CCA described in point 2 above.

4. The equipment, upon correct reception of a packet which was intended for this equipment, can skip CCA and immediately (see note 3) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 3: For the purpose of multi-cast, the ACK transmissions (associated with the same data packet) of the individual devices are allowed to take place in a sequence.

5. The energy detection threshold for the CCA shall be proportional to the maximum transmit power (PH) of the transmitter: for a 23 dBm equivalent isotropically radiated power (e.i.r.p.) transmitter, the CCA threshold level (TL) shall be equal or lower than −73 dBm/MHz at the input to the receiver (assuming a 0 dBi receive antenna). For other transmit power levels, the CCA TL shall be calculated using the formula: TL=−73 dBm/MHz+23−PH (assuming a 0 dBi receive antenna and PH specified in dBm e.i.r.p.).

An example to illustrate EN 301.893 is provided in FIG. 6.

Licensed Assisted Access (LAA) to Unlicensed Spectrum Using LTE

Until now, the spectrum used by LTE is dedicated to LTE. This has the advantage that an LTE system does not need to coexist with other, non-3GPP radio access technologies in the same spectrum, and spectrum efficiency can be maximized. However, the spectrum allocated to LTE is limited and, therefore, cannot meet the ever-increasing demand for larger throughput from applications/services. Therefore, a new study item has been initiated in 3GPP on extending LTE to exploit unlicensed spectrum in addition to licensed spectrum.

With Licensed Assisted Access (LAA) to unlicensed spectrum, as shown in FIG. 7, a UE is connected to a PCell in the licensed band and one or more SCells in the unlicensed band. In this application, a SCell in unlicensed spectrum is denoted as LAA Secondary Cell (LAA SCell). The LAA SCell may operate in downlink-only mode or operate with both uplink and downlink traffic. Furthermore, in future scenarios, the LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as a IEEE 802.11 system (i.e., a Wi-Fi system).

To coexist fairly with the Wi-Fi system, transmission on the SCell must conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms according to EN 301.893. An example of LAA to unlicensed spectrum using LTE CA and LBT to ensure good coexistence with other unlicensed band technologies is shown in FIG. 8 with different examples for the duration of a transmission burst on the LAA SCell constrained by a maximum allowed transmission duration of 4 ms.

There is currently no LBT specification for LTE as it has, so far, operated exclusively in licensed spectrum. Reusing the existing LBT procedure for load-based equipment in EN 301.893 will lead to LAA capturing the majority of the channel access opportunities and starvation of Wi-Fi devices, due to the lack of defer periods, shorter CCA durations compared to DIFS/PIFS, and several other differences from the Wi-Fi CSMA/CA channel contention procedure. Furthermore, it is not technically feasible for LAA LTE to exactly reuse the existing Wi-Fi CSMA/CA protocol. Therefore, there is a need for LBT procedures for LTE in the context of LAA.

SUMMARY

Systems and methods relating to Listen before Talk (LBT) procedures suitable for, e.g., License Assisted Access (LAA) to an unlicensed frequency spectrum or Long Term Evolution Unlicensed (LTE-U) are disclosed. In some embodiments, a method of operation of a node of a cellular communications network comprises performing a LBT procedure for an observed channel in an unlicensed frequency spectrum. The LBT procedure defers at least one Clear Channel Assessment (CCA) slot such that the LBT procedure concludes at or near a desired starting point for a transmission. The at least one CCA slot comprises at least one of a first CCA slot of the LBT procedure, one or more intermediate CCA slots of the LBT procedure, and a final CCA slot of the LBT procedure. The method further comprises performing the transmission on the observed channel upon completion of the LBT procedure. In this manner, among other things, the duration of any reservation signals can be reduced or minimized and transmission of complete or near-complete subframes can be facilitated, at least in some embodiments.

In some embodiments, performing the LBT procedure comprises, for each CCA slot of the at least one CCA slot deferred by the LBT procedure, deferring the CCA slot to a next desired CCA slot starting point of a plurality of desired CCA slot starting points. In some embodiments, the plurality of desired CCA slot starting points is predefined relative to subframe boundaries. In other embodiments, the plurality of desired CCA slot starting points is at or near subframe boundaries. In other embodiments, the plurality of desired CCA slot starting points is subframe boundaries. In other embodiments, the plurality of desired CCA slot starting points is a predefined number of symbol periods before subframe boundaries. In other embodiments, the plurality of desired CCA slot starting points is a predefined number of symbol periods after subframe boundaries.

In some embodiments, performing the LBT procedure comprises, for each CCA slot of the at least one CCA slot deferred by the LBT procedure, deferring the CCA slot to a predefined time relative to a subsequent (e.g., next) subframe boundary.

In some embodiments, the at least one CCA slot comprises the first CCA slot of the LBT procedure. In other embodiments, the at least one CCA slot comprises one or more intermediate CCA slots of the LBT procedure. In other embodiments, the at least one CCA slot comprises the final CCA slot of the LBT procedure.

In some embodiments, the transmission is a data transmission, and performing the LBT procedure comprises randomly selecting a backoff counter (N), observing the observed channel during a first CCA slot having an initial CCA duration ($T_0$), deferring a next CCA slot to a next desired CCA slot starting point upon determining that the observed channel is busy during the first CCA slot, and observing the observed channel during the next CCA slot having the initial CCA duration ($T_0$) starting at the next desired CCA slot starting point. Further, in some embodiments, performing the LBT procedure further comprises, upon determining that the observed channel is idle during the first CCA slot, observing the observed channel during an additional CCA slot having a CCA duration ($T_1$) that is different than the initial CCA duration ($T_0$) and deferring a next CCA slot to a next desired CCA slot starting point upon determining that the observed channel is busy during the additional CCA slot.

In some embodiments, the transmission is a data transmission, and performing the LBT procedure comprises randomly selecting a backoff counter (N) and performing an extended CCA procedure until the backoff counter (N) is equal to 1. Performing the LBT procedure further comprises, upon the backoff counter (N) reaching a value of 1, making a decision as to whether a last CCA slot of the extended CCA procedure should be deferred in order for the extended CCA procedure, and thus the LBT procedure, to conclude at or near a desired starting point for the data transmission. Performing the LBT procedure further comprises, if the decision is made to defer the last CCA slot, deferring a start of the last CCA slot to a next desired CCA slot starting point.

In some embodiments, the transmission is a data transmission, and performing the LBT procedure comprises randomly selecting a backoff counter (N) and performing an extended CCA procedure until the backoff counter (N) is equal to 2. Performing the LBT procedure further comprises, upon the backoff counter (N) reaching a value of 2, observing the observed channel during a CCA slot having an extended CCA duration ($T_3$). Performing the LBT procedure further comprises, upon determining that the observed channel is busy during the CCA slot having the extended CCA duration ($T_3$), deferring a next CCA slot to a next desired CCA slot starting point.

In some embodiments, the transmission is a data transmission, and performing the LBT procedure comprises randomly selecting a backoff counter (N) and performing an extended CCA procedure until the backoff counter (N) is equal to 2. Performing the LBT procedure further comprises, upon the backoff counter (N) reaching a value of 2, making a decision as to whether a next CCA slot of the extended CCA procedure should be deferred in order for the extended CCA procedure, and thus the LBT procedure, to conclude at or near a desired starting point for the data transmission. Performing the LBT procedure further comprises, if the decision is made to defer the next CCA slot, deferring a start of the next CCA slot to a next desired CCA slot starting point. Further, in some embodiments, performing the LBT procedure further comprises, if the decision is made to not defer the next CCA slot, observing the observed channel during a CCA slot having an extended CCA duration ($T_3$) and, upon determining that the observed channel is busy during the CCA slot having the extended CCA duration ($T_3$), repeating the step of making a decision as to whether a next CCA slot of the extended CCA procedure should be deferred in order for the extended CCA procedure, and thus the LBT procedure, to conclude at or near a desired starting point for the data transmission.

In some embodiments, the transmission is a control or management transmission, and performing the LBT procedure comprises observing the observed channel during a first CCA slot having an initial CCA duration ($T_0$), making a decision as to whether a next CCA slot of should be deferred in order for the LBT procedure to conclude at or near a desired starting point for the control or management transmission upon determining that the observed channel is busy during an additional CCA slot, and deferring a start of the next CCA slot to a next desired CCA slot starting point if the decision is made to defer the next CCA slot.

In some embodiments, the transmission is a control or management transmission, and performing the LBT procedure comprises making a decision as to whether a first CCA slot should be deferred in order for the LBT procedure to conclude at or near a desired starting point for the control or management transmission and, if the decision is made to defer the first CCA slot, deferring a start of the first CCA slot to a next desired CCA slot starting point. Further, in some embodiments, performing the LBT procedure further comprises randomly selecting a backoff counter (N), observing the observed channel during the first CCA slot, and performing an extended CCA procedure until the backoff counter (N) is equal to 0, upon determining that the observed channel is busy during the first CCA slot.

In some embodiments, the transmission is a control or management transmission, and performing the LBT procedure comprises randomly selecting a backoff counter (N), observing the observed channel during a first CCA slot having an initial CCA duration ($T_0$), and making a decision as to whether a next CCA slot should be deferred in order for the LBT procedure to conclude at or near a desired starting point for the control or management transmission upon determining that the observed channel is busy during an additional CCA slot. Performing the LBT procedure further comprises deferring a start of the next CCA slot to a next desired CCA slot starting point if the decision is made to defer the next CCA slot, and performing an extended CCA procedure until the backoff counter (N) is equal to 0, whether or not the decision is made to defer the next CCA slot.

In some embodiments, the transmission is a control or management transmission, and performing the LBT procedure comprises randomly selecting a backoff counter (N) and making a decision as to whether a first CCA slot should be deferred in order for the LBT procedure to conclude at or near a desired starting point for the control or management transmission. Performing the LBT procedure further comprises deferring a start of the first CCA slot to a next desired CCA slot starting point if the decision is made to defer the first CCA slot and observing the observed channel during the first CCA slot having an initial CCA duration ($T_0$), whether or not the decision is made to defer the first CCA slot. Performing the LBT procedure further comprises, upon determining that the observed channel is busy during the first CCA slot, performing an extended CCA procedure until the backoff counter (N) is equal to 0. Performing the extended CCA procedure comprises observing the observed channel during an additional CCA slot having a CCA duration ($T_1$) that is different than the initial CCA duration ($T_0$), making a decision as to whether a next CCA slot of the extended CCA procedure should be deferred in order for the extended CCA procedure, and thus the LBT procedure, to conclude at or near a desired starting point for the data transmission upon determining that the observed channel is busy during the additional CCA slot, and deferring a start of the next CCA slot to a next desired CCA slot starting point if the decision is made to defer the next CCA slot.

In some embodiments, the node supports multi-carrier transmission, the observed channel in the unlicensed frequency spectrum is for a first carrier, and performing the LBT procedure comprises, for each carrier of a plurality of carriers for multi-carrier operation including the first carrier and one or more additional carriers, performing an LBT procedure for an observed channel for the carrier and an unlicensed frequency spectrum. The LBT procedure defers at least one CCA slot such that the LBT procedure concludes at or near a desired starting point for a transmission on the carrier in the observed channel. The at least one CCA slot comprises at least one of a first CCA slot of the LBT procedure, one or more intermediate CCA slots of the LBT procedure, and a final CCA slot of the LBT procedure.

In some embodiments, the node supports multi-carrier transmission, the observed channel in the unlicensed frequency spectrum is for a first carrier, and performing the LBT procedure comprises performing a coordinated LBT procedure, with CCA slot deferral, for multiple observed channels on multiple carriers for multi-carrier operation comprising the first carrier and one or more additional carriers such that the coordinated LBT procedure concludes at or near a desired starting point for transmissions on the multiple carriers.

In some embodiments, the node supports multi-carrier transmission, the observed channel in the unlicensed frequency spectrum is for a first carrier, and the method further comprises performing a LBT procedure for a second observed channel for a second carrier in an unlicensed frequency spectrum. The LBT procedure for the second observed channel comprises deferring the start of a CCA slot for observation of the second observed channel such that the CCA slot for observation of the second observed channel is aligned with the final CCA slot of the LBT procedure for the observed channel for the first carrier.

In some embodiments, the method further comprises configuring one or more settings for the LBT procedure based on a Quality of Service (QoS) class of an associated bearer, wherein performing the LBT procedure comprises performing the LBT procedure using the one or more settings.

In some embodiments, at least some CCA slots of the LBT procedure are of different durations.

In some embodiments, the node is a wireless device, and the method further comprises receiving a configuration of one or more LBT settings for the LBT procedure from a network node.

In some embodiments, the node is a radio access node. In other embodiments, the node is a wireless device. In other embodiments, the node is an LAA node. In other embodiments, the node is an LTE-U node.

Embodiments of a node of a cellular communications network are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
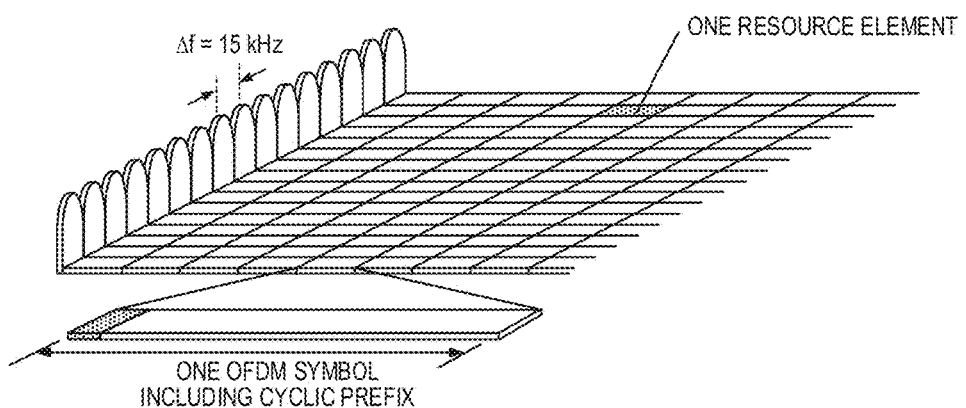
FIG. 1 is a time-frequency grid representative of the basic Long Term Evolution (LTE) downlink physical resource.
Figure 2:
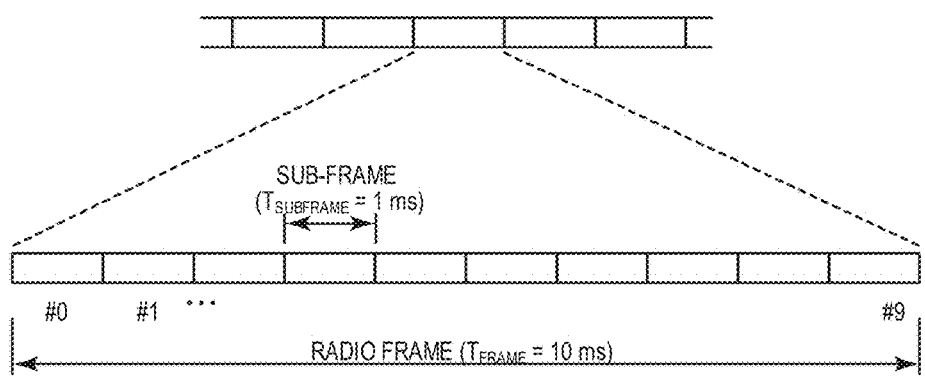
FIG. 2 is a time domain representation of the frame structure of an LTE downlink transmission.
Figure 3:
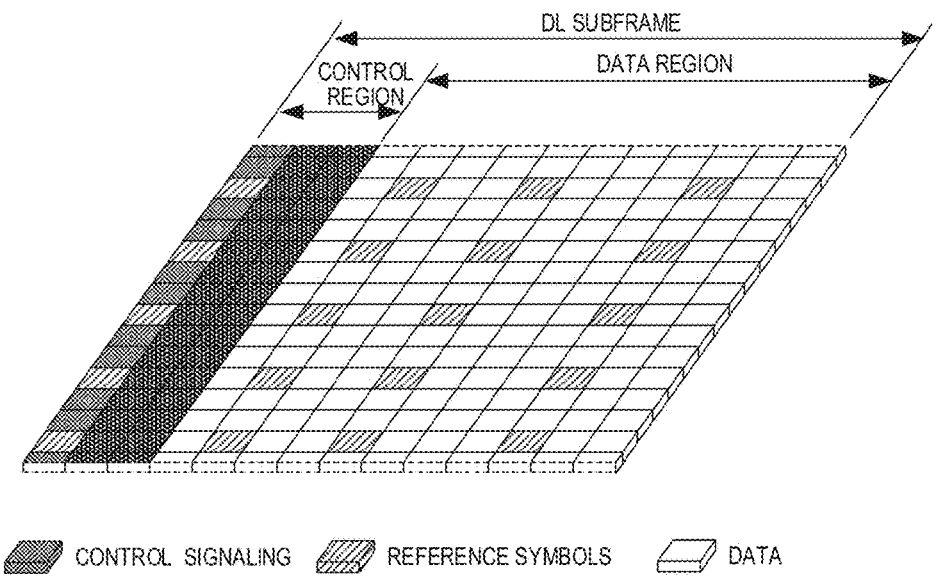
FIG. 3 illustrates an LTE downlink system with a Control Format Indicator (CFI) of three Orthogonal Frequency Division Multiplexing (OFDM) symbols.
Figure 4:
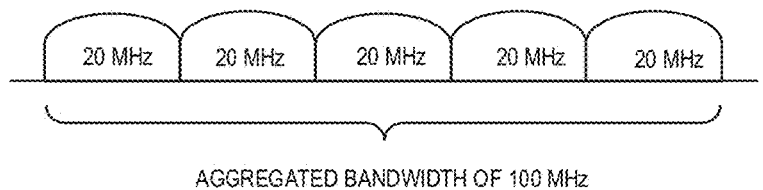
FIG. 4 illustrates Carrier Aggregation (CA)
Figure 5:
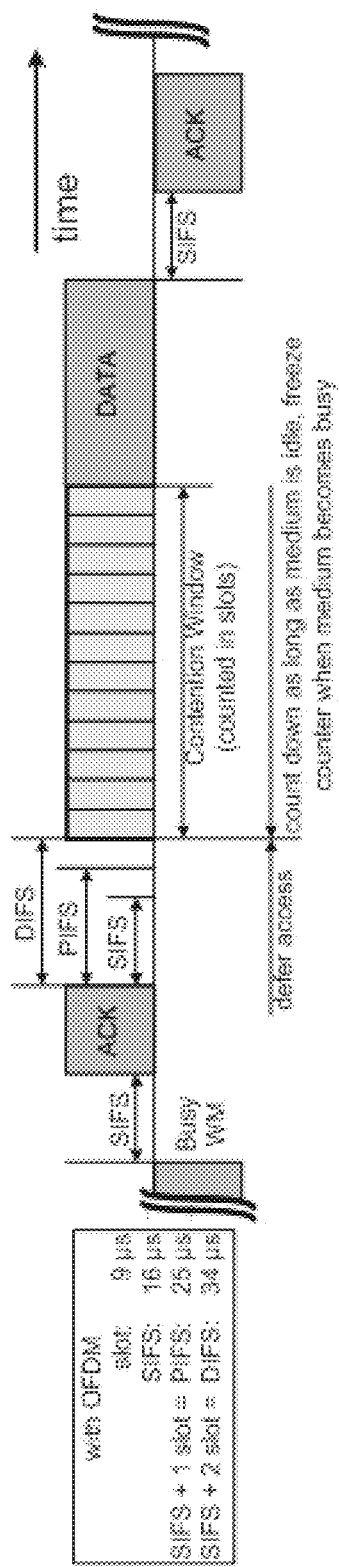
FIG. 5 is a general illustration of a Listen Before Talk (LBT) mechanism.
Figure 6:
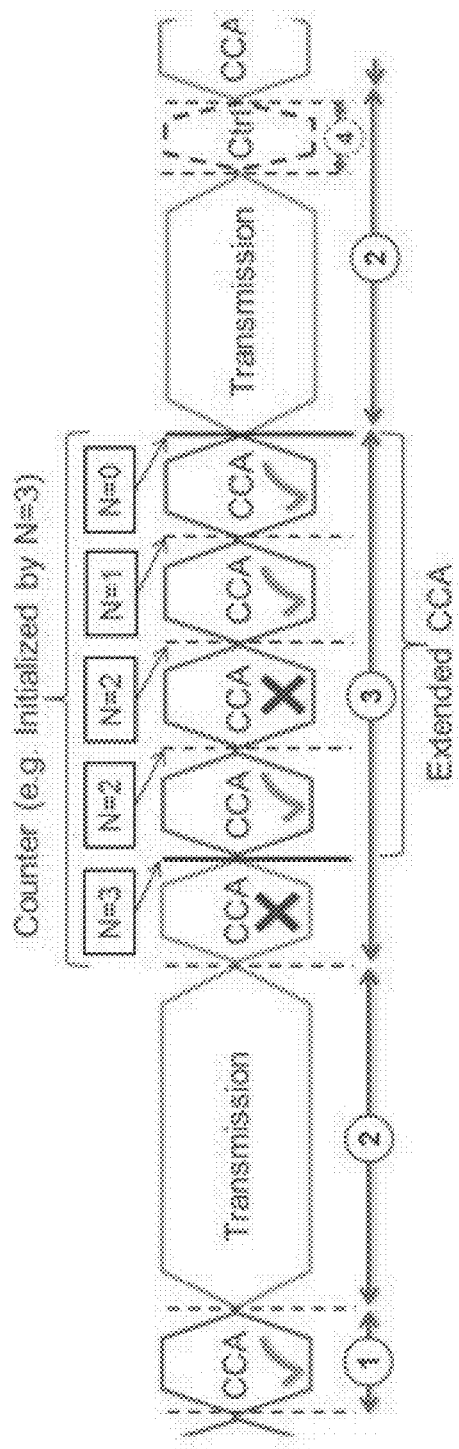
FIG. 6 is an example that illustrates EN 301.893.
Figure 7:
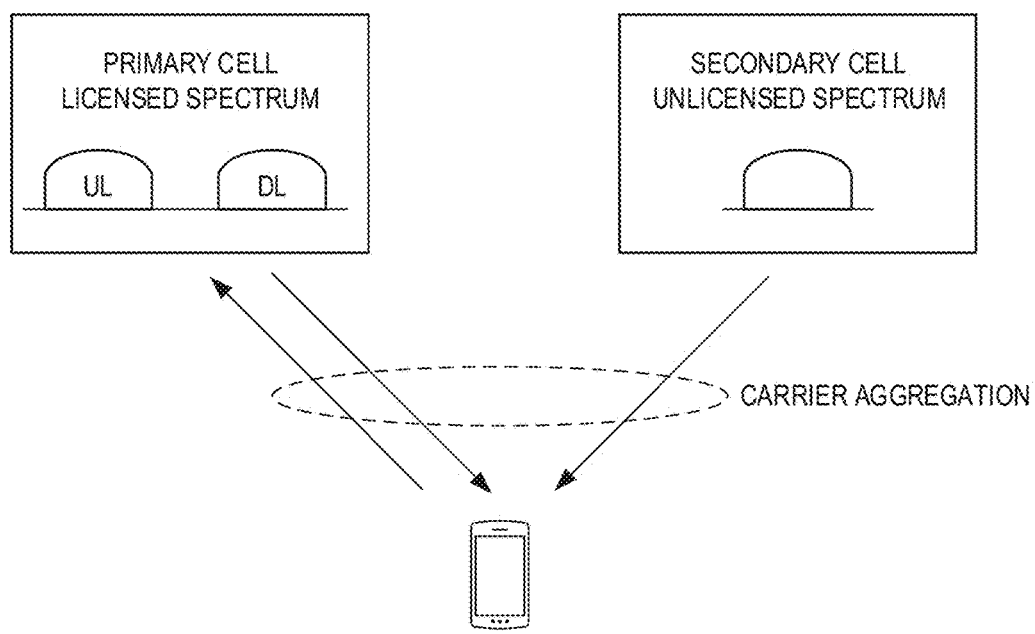
FIG. 7 illustrates License Assisted Access (LAA) to an unlicensed spectrum.
Figure 8:
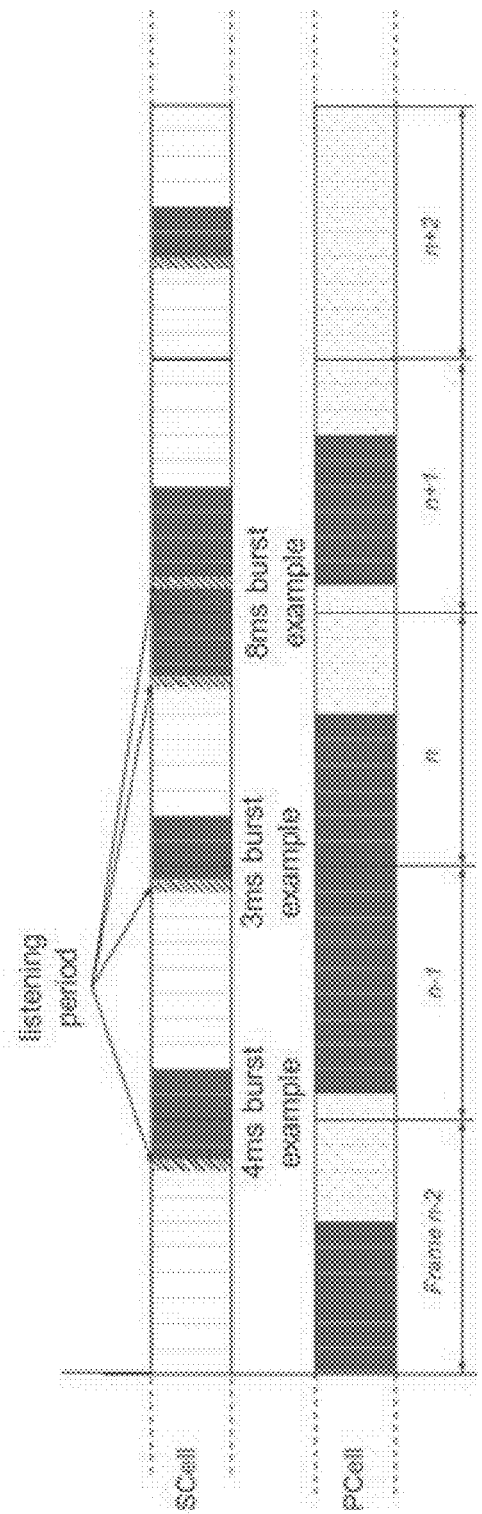
FIG. 8 is an example of LAA to an unlicensed spectrum using LTE CA and LBT.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The Third Generation Partnership Project (3GPP) initiative "License Assisted Access" (LAA) intends to allow Long Term Evolution (LTE) equipment (e.g. base stations) and to operate in an unlicensed 5 GHz radio spectrum. The unlicensed 5 GHz spectrum is used as a complement to a licensed spectrum. Accordingly, devices connect in the licensed spectrum (i.e., connect to a primary cell (PCell)) and use Carrier Aggregation (CA) to benefit from additional transmission capacity in the unlicensed spectrum (i.e., via one or more secondary cells (SCells)). To reduce changes required for aggregating the licensed and unlicensed spectrums, LTE frame timing in the PCell is simultaneously used in the SCell.

However, regulatory requirements may not permit transmissions in the unlicensed spectrum without prior channel sensing. Since the unlicensed spectrum must be shared with other radios of similar or dissimilar wireless technologies, a so-called Listen Before Talk (LBT) procedure needs to be applied. Today, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi."

In Europe, the LBT procedure is under the scope of EN 301.893 regulation. For LAA to operate in the 5 GHz spectrum, the LAA LBT procedure must conform to requirements and minimum behaviors set forth in EN 301.893. However, additional system designs and steps are needed to ensure coexistence of Wi-Fi and LAA with EN 301.893 LBT procedures.

An example of LBT in Orthogonal Frequency Division Multiplexing (OFDM) is U.S. Pat. No. 8,774,209 B2, "Apparatus and method for spectrum sharing using listen-before-talk with quiet periods," where LBT is adopted by frame-based OFDM systems to determine whether the channel is free prior to transmission. A maximum transmission duration timer is used to limit the duration of a transmission burst, and is followed by a quiet period. In contrast, the present disclosure focuses on the LBT phase of a load-based OFDM system, and is designed to ensure fairer coexistence with other radio access technologies, such as Wi-Fi, while, at least in Europe, also satisfying EN 301.893 regulations.

There is currently no LBT specification for LTE as it has, so far, operated exclusively in licensed spectrum. Reusing existing LBT procedures for load-based equipment in EN 301.893 will lead to LAA capturing the majority of channel access opportunities and starvation of Wi-Fi devices, due to the lack of defer periods, shorter Clear Channel Assessment (CCA) durations compared to DIFS/PIFS, and several other differences from the Wi-Fi Carrier Sense Multiple Access with Collision Avoidance (CSMA/CA) channel contention procedure. Furthermore, it is not technically feasible for LAA LTE to exactly reuse existing Wi-Fi CSMA/CA protocol.

Figure 9:
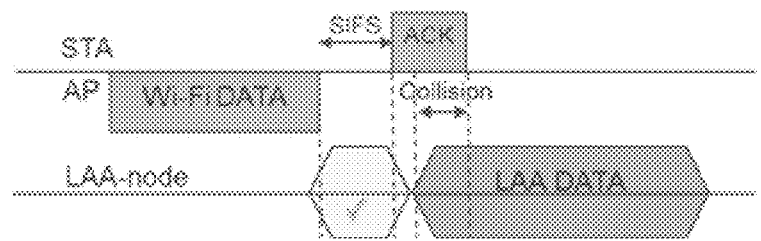
FIGS. 9 through 11 illustrate problems associated with conventional LAA using LTE CA and LBT.
Figure 10:
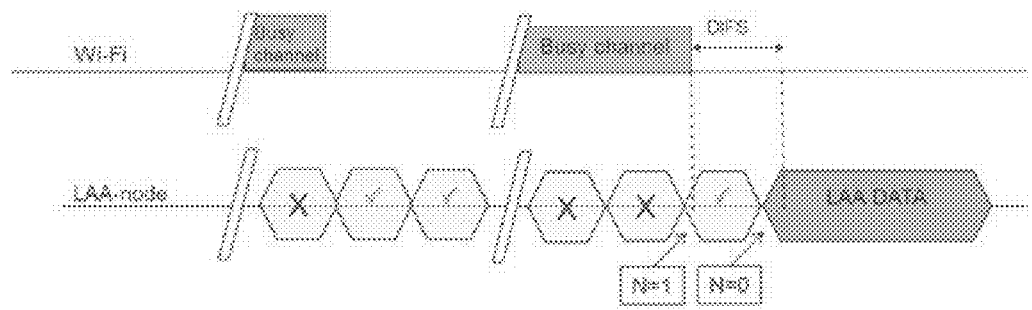
Figure 11:
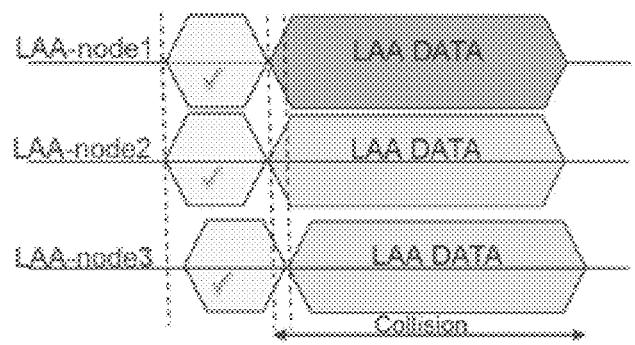

FIGS. 9 through FIG. 11 provide exemplary illustrations of some of the problems mentioned above. In the first case illustrated in FIG. 9, EN 301.893 regulation allows a node to transmit immediately after performing an initial CCA, which results in collision with a Wi-Fi Acknowledgement (ACK) frame. This is because the energy that is measured inside the CCA period may only occur in a small portion of the CCA period, thus resulting in an energy measurement that is insufficient to register as the channel being occupied/busy. In other words, FIG. 9 illustrates a collision between an LAA transmission and a Wi-Fi ACK due to initial CCA and a lack of a defer period. In the second case illustrated in FIG. 10, a similar problem occurs during a random backoff phase of LAA, where a counter for idle CCA slots during an extended CCA is decreased and found to be zero with a total of 20 µs idle channel observation time after the channel has been occupied. On the other hand, a Wi-Fi device will not resume countdown until the channel has been idle for 34 µs, which also results in collision with a Wi-Fi ACK frame. In other words, FIG. 10 illustrates LAA transmission collision with Wi-Fi ACK due to extended CCA and lack of a defer period. In the third case illustrated in FIG. 11, multiple nodes conform to EN 301.893 but with a slight inaccuracy in timing maintenance resulting in the inability to achieve fair sharing of a channel because nodes with a CCA boundary that occurs earlier will seize the channel before the other nodes. In other words, FIG. 11 illustrates collision among synchronized LAA nodes transmissions due to initial CCA and a lack of post random back-off.

Figure 12:
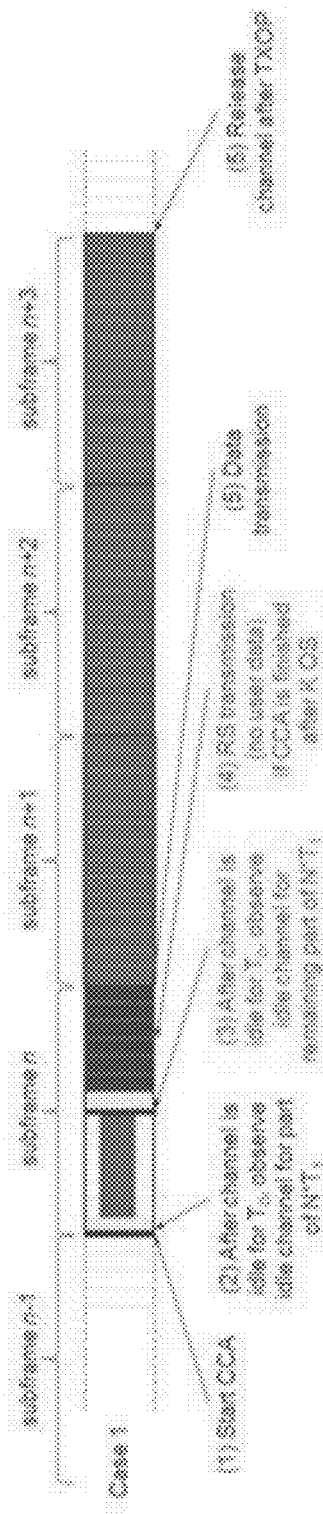
FIG. 12 is an example implementation of an extended Clear Channel Assessment (CCA) procedure for load-based equipment.

Furthermore, an example implementation of an extended CCA procedure for load-based equipment specified in EN 301.893 v.1.7.1 (sometimes referred to as EN BRAN) is shown in FIG. 12, where the CCAs can be initiated at any time instance within a subframe. If the backoff counter reaches zero in the middle of a subframe after the last CCA is deemed to be clear, then the LAA node must immediately transmit a reservation signal in the remainder of the subframe to reserve the medium before it can commence data transmission. The overhead due to the reservation signal can be quite significant as seen in FIG. 12.

A problem of fair contention between LAA LTE and LAA LTE, and between LAA LTE and other technologies for channel access on an unlicensed carrier is solved using embodiments of an LBT procedure for LAA described herein. The embodiments of the LBT procedure disclosed herein also reduce the overhead associated with channel reservation signaling prior to data transmission. In general, selected CCA instances, which are also referred to herein as CCA slots, when LBT starts or resumes during the extended CCA cycle, such as terminal or penultimate CCAs, can be deferred to particular time instances which minimize the duration of any channel reservation signals, and also facilitate transmission of complete or near-complete subframes.

More specifically, embodiments of a new LBT procedure are defined for load-based systems operating in unlicensed bands, with selected CCA instances performed at predefined allowable time instances relative to subframe or slot boundaries. The decision of whether to defer a CCA to a next CCA starting point for example may be made based on, e.g., a position within the subframe of a last CCA that was found to be busy.

Figure 13:
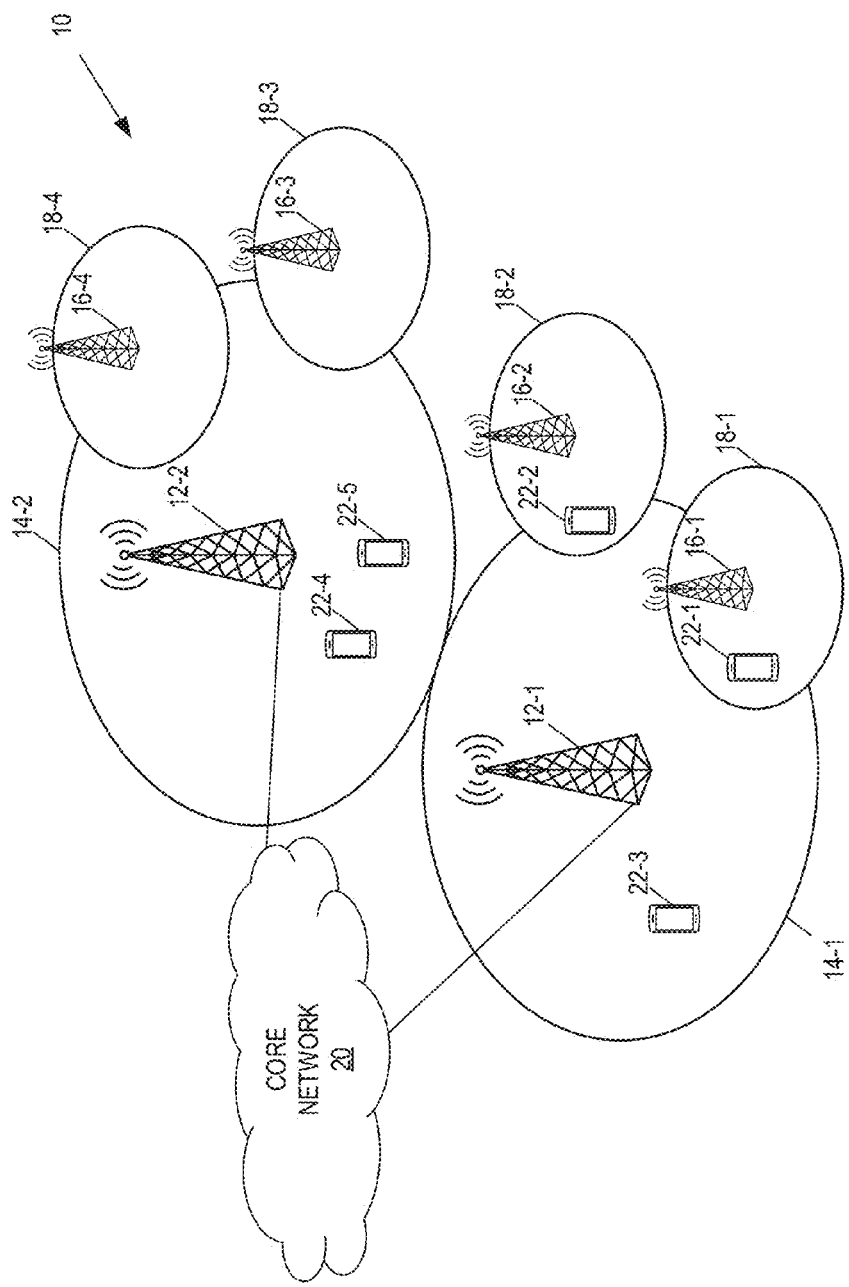
FIG. 13 illustrates one example of a cellular communications network according to some embodiments of the present disclosure.

FIG. 13 illustrates one example of a cellular communications network 10 according to some embodiments of the present disclosure. In the embodiments described herein, the cellular communications network 10 is an LTE network providing LAA for unlicensed spectrum, e.g., the 5 GHz spectrum; however, the present disclosure is not limited thereto. In this example, the cellular communications network 10 includes base stations 12-1 and 12-2, which in LTE are referred to as Evolved Node Bs (eNBs), controlling corresponding macro cells 14-1 and 14-2. The base stations 12-1 and 12-2 are generally referred to herein collectively as base stations 12 and individually as base station 12. Likewise, the macro cells 14-1 and 14-2 are generally referred to herein collectively as macro cells 14 and individually as macro cell 14. The cellular communications network 10 also includes a number of low power nodes 16-1 through 16-4 controlling corresponding small cells 18-1 through 18-4. In LTE, the low power nodes 16-1 through 16-4 can be small base stations (such as pico or femto base stations) or Remote Radio Heads (RRHs), or the like. Notably, while not illustrated, one or more of the small cells 18-1 through 18-4 may alternatively be provided by the base station 12. The low power nodes 16-1 through 16-4 are generally referred to herein collectively as low power nodes 16 and individually as low power node 16. Likewise, the small cells 18-1 through 18-4 are generally referred to herein collectively as small cells 18 and individually as small cell 18. The base stations 12 (and optionally the low power nodes 16) are connected to a core network 20.

The base stations 12 and the low power nodes 16 provide service to wireless devices 22-1 through 22-5 in the corresponding cells 14 and 18. The wireless devices 22-1 through 22-5 are generally referred to herein collectively as wireless devices 22 and individually as wireless device 22. In LTE, the wireless devices 22 are referred to as User Equipments (UEs).

In this example, the macro cells 14 are provided in a licensed frequency spectrum (i.e., in the frequency spectrum dedicated for the cellular communications network 10), whereas one or more (and possibly all) of the small cells 18 are provided in an unlicensed frequency spectrum (e.g., the 5 Gigahertz (GHz) frequency spectrum). Using the wireless device 22-1 as an example, the macro cell 14-1 is a PCell of the wireless device 22-1, and the small cell 18-1 is a LAA SCell of the wireless device 22-1. Thus, in this context, the macro cell 14-1 is sometimes referred to herein as the PCell 14-1 of the wireless device 22-1, and the small cell 18-1 is sometimes referred to herein as the LAA SCell 18-1 of the wireless device 22-1.

In this particular example, the low power nodes 16 (which may also be referred to as low power base stations) and/or the wireless devices 22 perform an LBT procedure before transmitting in the unlicensed spectrum. As discussed below, in order to, e.g., address the problems described above, the LBT procedure defers the start of one or more CCA slots such that the LBT procedure concludes at or near a desired starting point of a transmission (e.g., at or near a subframe or slot boundary). Note that a subframe boundary and a slot boundary are used interchangeably herein. In this context, the low power nodes 16 in the wireless device 22 are generally referred to herein as LAA nodes. However, the present disclosure is applicable to any type of LAA node (e.g., base station, RRH, UE/wireless device, etc.) for which the LBT procedure is to be performed prior to transmission in an unlicensed frequency spectrum. Further, while the description herein focuses on LAA and LAA nodes, the concepts described herein are equally applicable to standalone LTE Unlicensed (LTE-U) and LTE-U nodes, where, for standalone LTE-U, there may be no PCell in the licensed spectrum (i.e., there may be only a cell(s) in an unlicensed spectrum).

A description of embodiments of the proposed LBT protocol for load-based equipment follows. This is generally applicable for both downlink and uplink transmissions, for both Frequency Division Duplexing (FDD) and Time Division Duplexing (TDD) systems. For the case of LBT by the wireless devices 22 prior to uplink transmissions, the extended backoff counter for one or more wireless devices 22 may be derived from a common random seed, which for example may be communicated to the one or more wireless devices 22. The random seed could be given by bit field or Cyclic Redundancy Check (CRC) scrambling of an explicit Downlink Control Information (DCI) message field. In addition, the random seed could also be derived by the subframe, slot, and/or radio frame number, in combination with other parameters such as Primary Cell Identifier (PCID), operating frequency, etc. In yet another example, the random seed could be preconfigured to the wireless device 22 by Radio Resource Control (RRC) or by a parameter signaled by a control message field. The control message field could be a bit field included in Demodulation Reference Signal (DRS) transmission duration or separately broadcasted at given occasions. The LBT protocol in this disclosure is applicable to both LAA LTE and standalone LTE operation in license-exempt channels.

Figure 14:
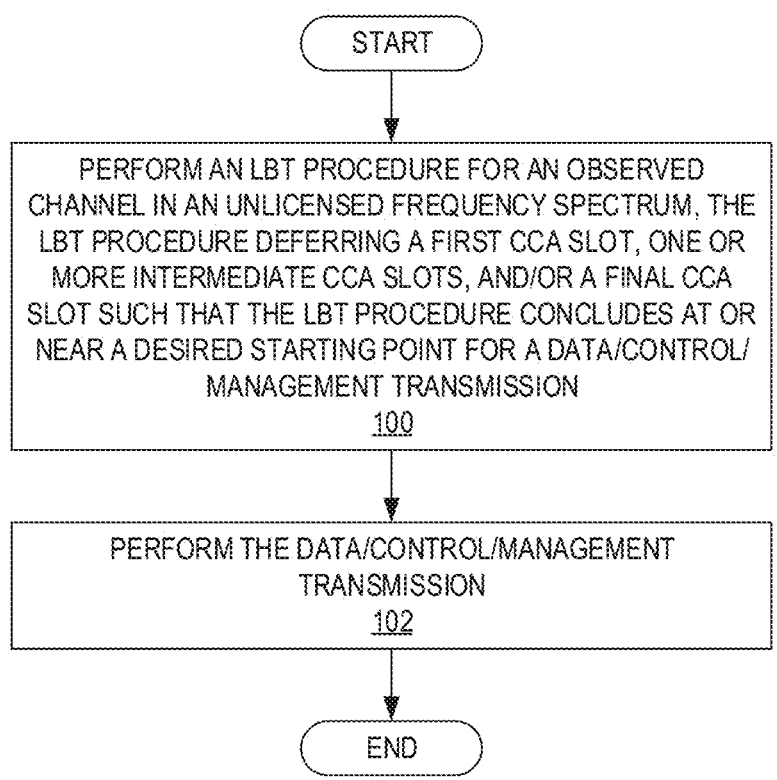
FIG. 14 is a flowchart that illustrates an LBT procedure performed by an LAA node according to some embodiments of the present disclosure.

FIG. 14 is a flowchart that illustrates an LBT procedure performed by an LAA node according to some embodiments of the present disclosure. As illustrated, the LAA node performs an LBT procedure for an observed channel in an unlicensed frequency spectrum (step 100). The LBT procedure defers one or more select CCA slots, which are referred to as deferred CCA slots. The one or more deferred CCA slots include a first CCA slot of the LBT procedure, one or more intermediate CCA slots of the LBT procedure, and/or a final CCA slot of the LBT procedure. The LBT procedure defers the one or more CCA slots such that the LBT procedure concludes at or near a desired starting point for a data/control/management transmission. For example, if it is desirable for the starting point of the transmission to be at the start of a subframe, then the LBT procedure defers one or more select CCA slots such that the LBT procedure concludes at or near a subframe boundary. As another example, if it is desirable for the starting point of the transmission to be at a predefined offset from the start of a subframe (e.g., at the fourth OFDM symbol in a subframe), then the LBT procedure defers one or more select CCA slots such that the LBT procedure includes at or near the start of the fourth OFDM symbol after a subframe boundary. Notably, as used herein, "at or near" a desired starting point of a transmission means at or within a small number of symbol periods (e.g., 1, 2, 3, or 4 symbol periods) from the desired starting point. At the conclusion of the LBT procedure, the LAA node as determined in the observed channel is idle and, as such, performs the data/control/management transmission on the observed channel (step 102).

LBT Procedure for Data Transmissions

Embodiments of the disclosed LBT will now be described that are particularly well-suited for, but not limited to, data transmissions that are carried, for example, on the Physical Downlink Shared Channel (PDSCH) or Physical Uplink Shared Channel (PUSCH). For illustrative purposes, assume the LAA node always performs an initial CCA of duration $T_0$. If the channel is unoccupied during the initial CCA, then an extended CCA procedure for N CCA durations of $T_1$ each are performed. As a non-limiting example, both initial and extended CCA durations may be the same value, such as $T_0=T_1=20$ μs. In other cases, the initial and extended CCA durations may be different, such as $T_0=23$ μs and $T_1=20$ μs.

Figure 15:
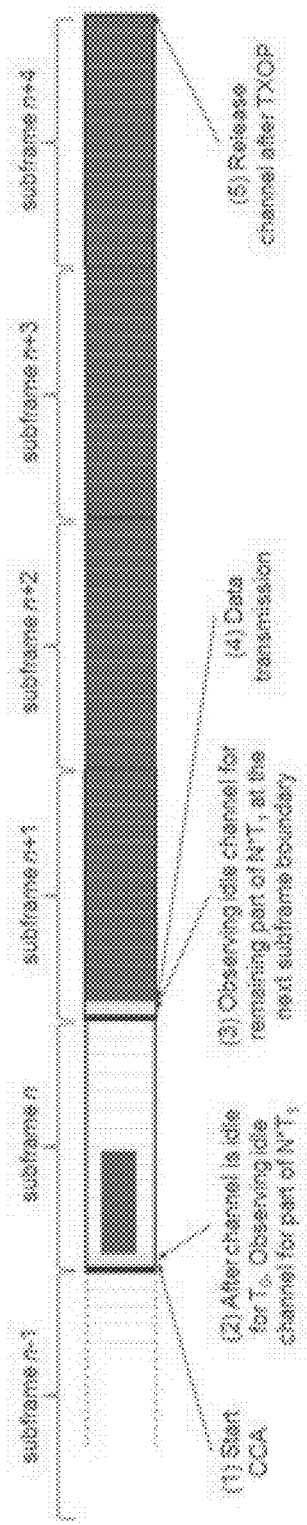
FIG. 15 illustrates one example of the LBT procedure of FIG. 14 for downlink LBT according to some embodiments of the present disclosure.

The main principle of some embodiments of the disclosed LBT procedure is to be able to defer certain CCA durations, which are also referred to herein as CCA slots, in an extended CCA stage to be completed at time instances that are adjacent to (i.e., at or near) subframe or slot boundaries. These allowed CCA time instances are referred to herein as CCA starting points. As a non-limiting example, a last CCA out of the N extended CCAs, or a subset of the N CCAs, can be performed just prior to a subframe boundary, such that if the CCA(s) is deemed to be clear, the LAA node can transmit a Release 12 (Rel-12) waveform in that upcoming subframe. Alternatively, the CCA starting points for select CCAs may coincide with the subframe boundary, or be performed just after the subframe boundary. A motivation to defer some or all of the CCAs is to ensure that the data transmission immediately after the final CCA is cleared starts from a favorable time instance, such as, e.g., at or right after a subframe boundary. This process is depicted in FIG. 15 for downlink LBT, where the initial CCA commences at a subframe boundary of subframe n. During a part of the extended CCA stage, the channel is detected to be busy. Instead of continuously listening to the channel and continuing with CCAs in the remainder of subframe n, the remaining CCAs are deferred to the next CCA starting point, at the next subframe boundary corresponding to subframe n+1.

In another example, the starting point of CCA for LBT operation can be determined depending on various parameters for example load in the system or history of LBT success. For example, in a low load system, the starting point of CCA for LBT can be determined to be closer to the subframe boundary while for a high load system or a system with high rate of LBT failure, the starting point of CCA for LBT can be further away from the subframe boundary.

A first embodiment of LBT with deferral of a select CCA(s) to certain CCA starting points is as follows. Here, an initial CCA is always followed by an extended CCA stage. The number of extended CCAs or backoff counter N is drawn randomly between 1 and q at the start of the random backoff process. If the initial CCA deems the channel to be busy, it is then repeated. For each extended CCA duration where the channel is deemed to be unoccupied, the backoff counter N is decremented by 1. If the channel is determined to be busy during an initial or extended CCA, the backoff counter is frozen and the LBT procedure reverts to the initial CCA step, with the commencement of the next CCA possibly deferred to the next CCA starting point. The data transmission can be performed immediately after the backoff counter value reaches zero, i.e., after N extended CCAs showing Idle channel state have been obtained.

Figure 16:
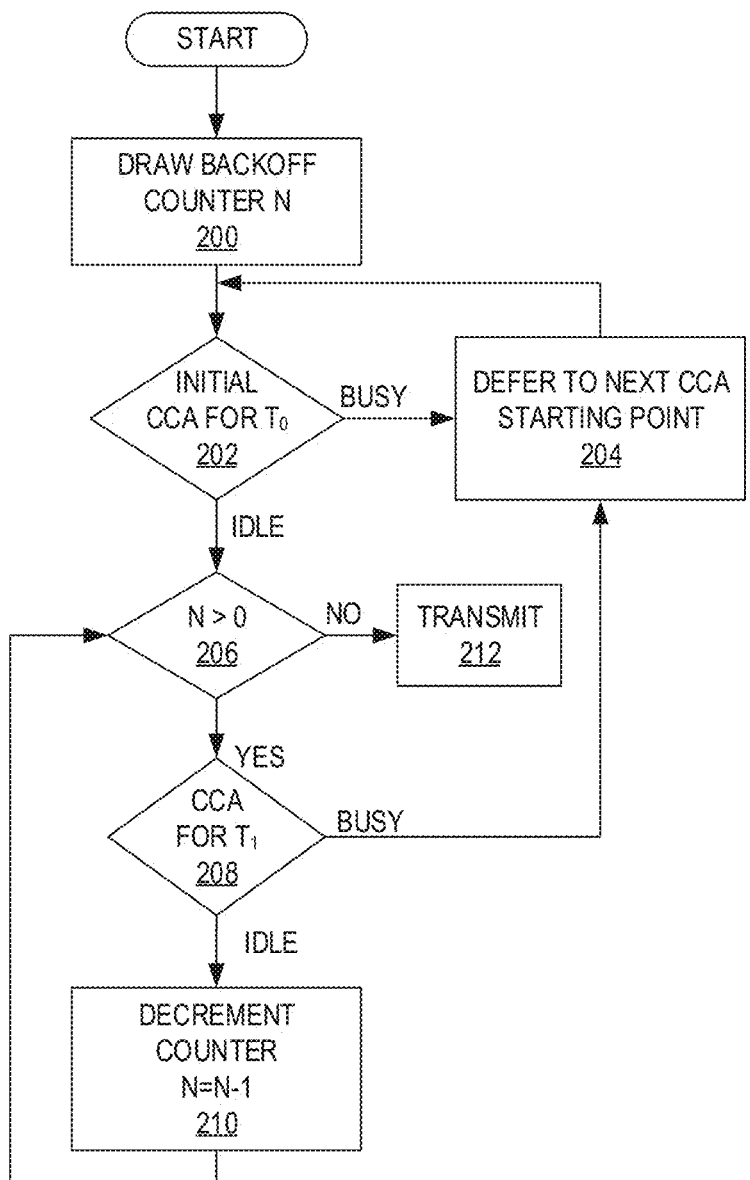
FIG. 16 is a flowchart for a first embodiment of LBT with deferral of a select CCA(s) to certain CCA starting points according to some embodiments of the present disclosure.

A flowchart for the first embodiment of LBT with deferral of a select CCA(s) to certain CCA starting points described above is illustrated in FIG. 16. This process is performed by the LAA node. As illustrated, the LAA node randomly draws, or selects, the backoff counter N as a value between 1 and q (step 200). The LAA node observes an observed channel in an unlicensed frequency spectrum during an initial CCA slot having a duration $T_0$ (step 202). In other words, the LAA node performs an initial CCA for the initial CCA slot having a duration $T_0$. Upon determining that the observed channel is busy during the initial CCA slot, the LAA node defers a next CCA slot to a next CCA starting point (step 204). The next CCA starting point is a desired starting point for the next CCA slot. Notably, in some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter N, system load, rate of recent LBT successes, or the like. In general, in some embodiments, the next CCA starting point is such that, if the next CCA slot begins at the next CCA starting point and the observed channel is subsequently determined to be idle for the remaining CCA slot(s), then the LBT procedure concludes at or near a desired starting point for a data transmission on the observed channel. Steps 202 and 204 are repeatedly performed until the LAA node determines that the observed channel is idle for the initial CCA duration $T_0$.

Upon determining that the observed channel is idle for the initial CCA duration $T_0$, the LAA node performs an extended backoff stage of the LBT procedure. More specifically, in this embodiment, the LAA node determines whether the backoff counter N is greater than zero (step 206). If so, the LA node observes the observed channel during a CCA slot having a duration $T_1$ (step 208). In other words, the LAA node performs a CCA for the CCA slot having a duration $T_1$. The duration $T_1$ is, in some embodiments, different than (e.g., less than) the duration $T_0$; however, in other embodiments, the durations $T_0$ and $T_1$ are the same. Upon determining that the observed channel is busy during the CCA slot, the LAA node defers a next CCA slot to a next CCA starting point (step 204). Conversely, upon determining that the observed channel is idle during the CCA slot, the LAA node decrements the backoff counter N (step 210), and the process then returns to step 206. Once the LAA node determines that the observed channel has been idle for N CCA slots (i.e., when the backoff counter N is equal to zero) (step 206, NO), the LBT procedure is concluded, and the LAA node performs the transmission (step 212).

In a second version of the first embodiment, the CCAs are not always deferred to the next starting point if the medium is found to be busy. In one example, the final CCA of the extended CCA stage may be conditionally deferred to the next CCA starting point if found to be busy. The decision of whether to defer to the next CCA starting point may, for example, be made based on the position within the subframe of the last CCA that was found to be busy, or on a combination of one or more of the factors in the section below titled "Logic for defer decision and determining the CCA starting point."

Figure 17:
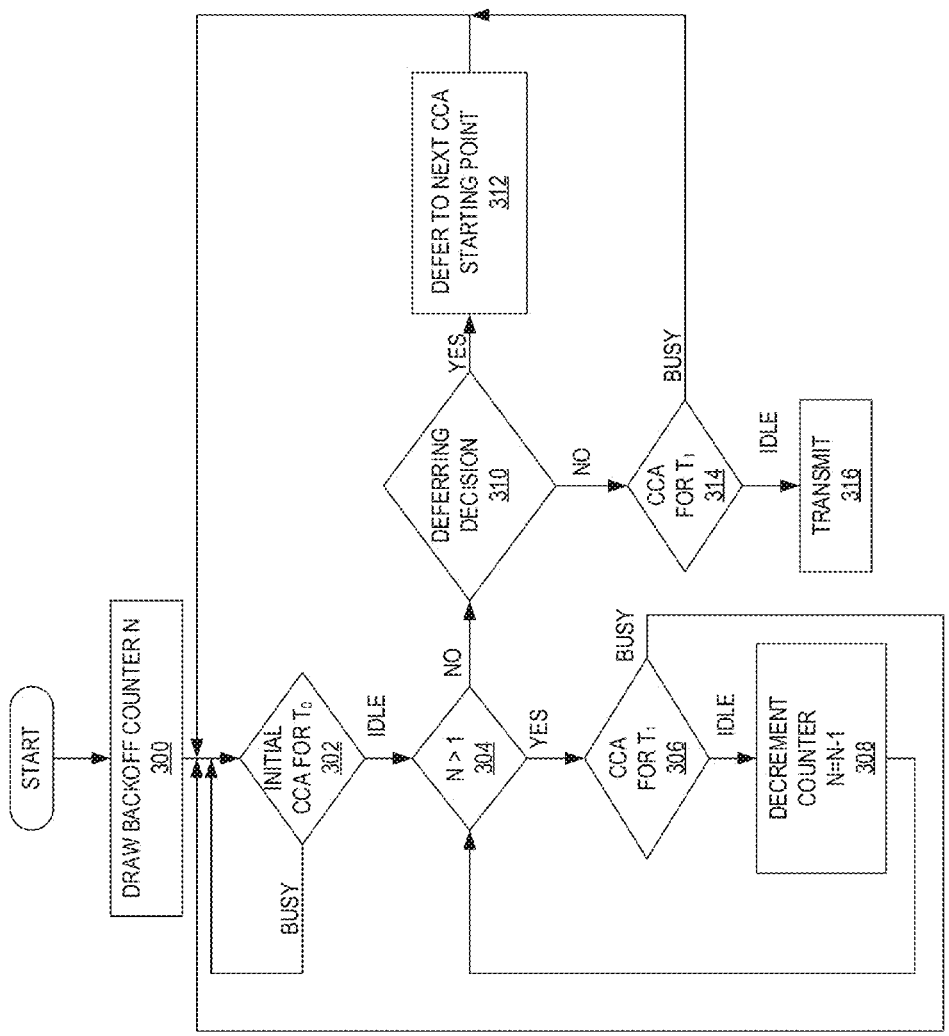
FIG. 17 is a flowchart that illustrates a second version of the first embodiment of LBT with deferral of a select CCA(s) to certain CCA starting points according to some embodiments of the present disclosure.

FIG. 17 is a flowchart that illustrates the second version of the first embodiment described above. Again, this procedure is performed by the LAA node. As illustrated, the LAA node randomly draws, or selects, a backoff counter N as a value between 1 and q (step 300). The LAA node observes an observed channel in an unlicensed frequency spectrum during an initial CCA slot having a duration $T_0$ (step 302). In other words, the LAA node performs an initial CCA for the initial CCA slot having a duration $T_0$. Upon determining that the observed channel is busy during the initial CCA slot, the LAA node repeats step 302 until the observed channel is determined, via a CCA, to be idle for the initial CCA duration $T_0$.

Upon determining that the observed channel is idle for the initial CCA duration $T_0$, the LAA node performs an extended backoff stage of the LBT procedure. In this version of the first embodiment, the extended back off stage of the LBT procedure waits to make a deferring decision until the last, or final, CCA slot. More specifically, in this embodiment, the LAA node determines whether the backoff counter N is greater than 1 (step 304). If so, the LA node observes the observed channel during a CCA slot having a duration $T_1$ (step 306). In other words, the LAA node performs a CCA for the CCA slot having a duration $T_1$. The duration $T_1$ is, in some embodiments, different than (e.g., less than) the duration $T_0$; however, in other embodiments, the durations $T_0$ and $T_1$ are the same. Upon determining that the observed channel is busy during the CCA slot, the LAA node returns to step 302. Conversely, upon determining that the observed channel is idle during the CCA slot, the LAA node decrements the backoff counter N (step 308), and the procedure then returns to step 304.

Once the LAA node determines that the backoff counter N is equal to 1 (step 304, NO), the LAA node makes a deferring decision as to whether or not the next CCA slot should be deferred (step 310). Notably, the next CCA slot will be the final CCA slot if the observed channel is determined to be idle during that CCA slot. While any suitable criteria or parameters may be used for the deferring decision, in general, the deferring decision is such that a decision is made to defer the next CCA slot to a next CCA starting point if doing so is needed in order for the LBT procedure to conclude at or near a desired starting point for the transmission. The decision of whether to defer to the next CCA starting point may, for example, be made based on the position within the subframe of the last CCA that was found to be busy, or on a combination of one or more of the factors in the section below titled "Logic for defer decision and determining the CCA starting point."

Upon making the decision to defer the next CCA slot, the LAA node defers the next CCA slot to a next CCA starting point (step 312) and the procedure then returns to step 302. The next CCA starting point is a desired starting point for the next CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter N, system load, rate of recent LBT successes, or the like. In general, in some embodiments, the next CCA starting point is such that, if the next CCA slot begins at the next CCA starting point and the observed channel is subsequently determined to be idle for the remaining CCA slot(s) (which in this example would include a CCA slot of duration $T_0$ in step 302 and a CCA slot of duration $T_1$ in step 314), then the LBT procedure concludes at or near a desired starting point for a data transmission on the observed channel.

Returning to step 310, if the decision is made not to defer the next CCA slot (step 310; NO), the LAA node observes the observed channel for a CCA slot a duration $T_1$ (step 314). Upon determining that the observed channel is busy, the procedure returns to step 302 and is repeated. Conversely, upon determining that the observed channel is idle, the LBT procedure concludes, and the LAA node performs transmission (step 316).

In a second embodiment of the LBT procedure, the countdown procedure is changed so that the backoff counter N is counted down for every free CCA occasion compared to the first embodiment wherein the initial CCA duration does not result in decrementing the backoff counter N. In order to support that the last CCA duration needs to result in a longer CCA duration time (which is referred to as $T_3$), this last procedure is moved out from the countdown procedure. If the channel is determined to be busy during an extended CCA, the commencement of the next CCA is possibly deferred to the next CCA starting point. The decision of whether to defer to the next CCA starting point for example may be made based on the position within the subframe of the last CCA that was found to be busy. In one implementation, the longer CCA duration $T_3$ is set to $2 \times T_1$. In a second implementation, the longer CCA duration $T_3$ is set to $T_0 + T_1$.

Figure 18:
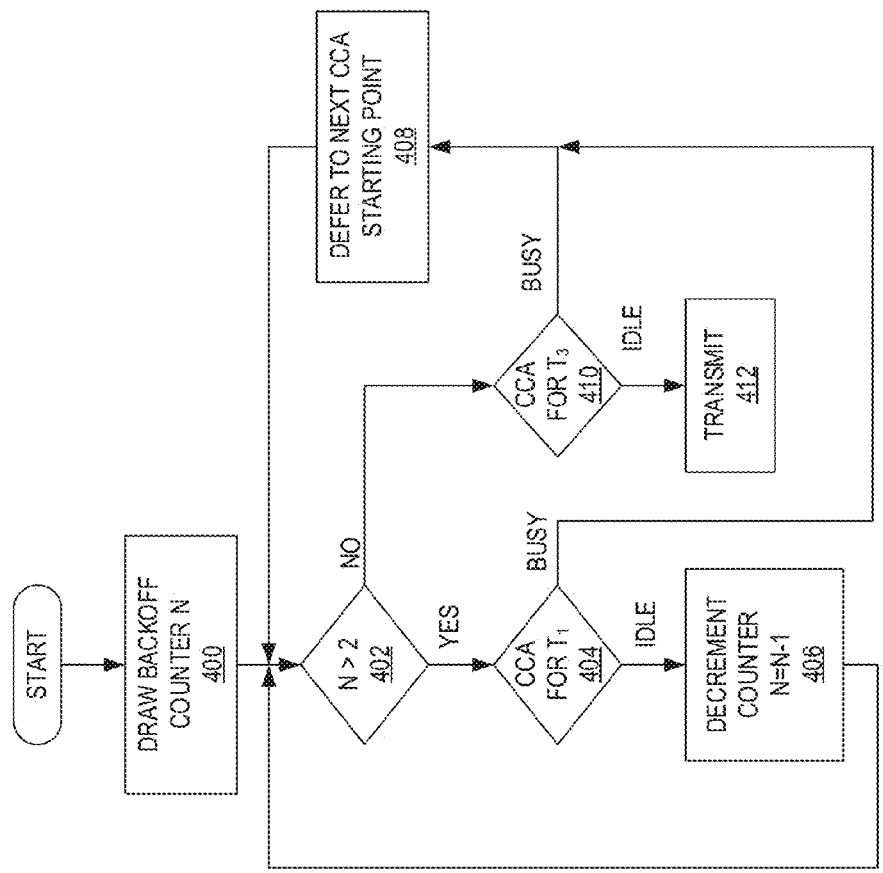
FIG. 18 is a flowchart that illustrates a first version of a second embodiment of an LBT procedure according to some embodiments of the present disclosure.

FIG. 18 is a flowchart that illustrates the first version of the second embodiment of the LBT procedure described above. Again, this procedure is performed by the LAA node. As illustrated, the LAA node randomly draws, or selects, a backoff counter N as a value between 1 and q (step 400). The LAA node determines whether the backoff counter N is greater than 2 (step 402). If so, the LAA node observes an observed channel during a CCA slot having a duration $T_1$ (step 404). In other words, the LAA node performs a CCA for the CCA slot having a duration $T_1$. Upon determining that the observed channel is idle during the CCA slot, the LAA node decrements the backoff counter N (step 406), and the procedure then returns to step 402. Conversely, upon determining that the observed channel is busy during the CCA slot, the LAA node defers the next CCA slot to the next CCA starting point as described above (step 408) and the procedure then returns to step 402.

Once the LAA node determines that the backoff counter N is equal to 2 (step 402, NO), the LAA node observes the observed channel during a CCA slot having the longer, or extended, duration $T_3$ (step 410). In other words, the LAA node performs a CCA for the CCA slot having a duration $T_3$. As discussed above, in one example implementation, the longer CCA duration $T_3$ is set to $2 \times T_1$. In another example implementation, the longer CCA duration $T_3$ is set to $T_0 + T_1$. Upon determining that the observed channel is busy during the CCA slot, the LAA node defers the next CCA slot to the next CCA starting point as described above (step 408) and the procedure then returns to step 402. Conversely, upon determining that the observed channel is idle during the CCA slot, the LBT procedure concludes, and the LAA node performs transmission (step 412).

Figure 19:
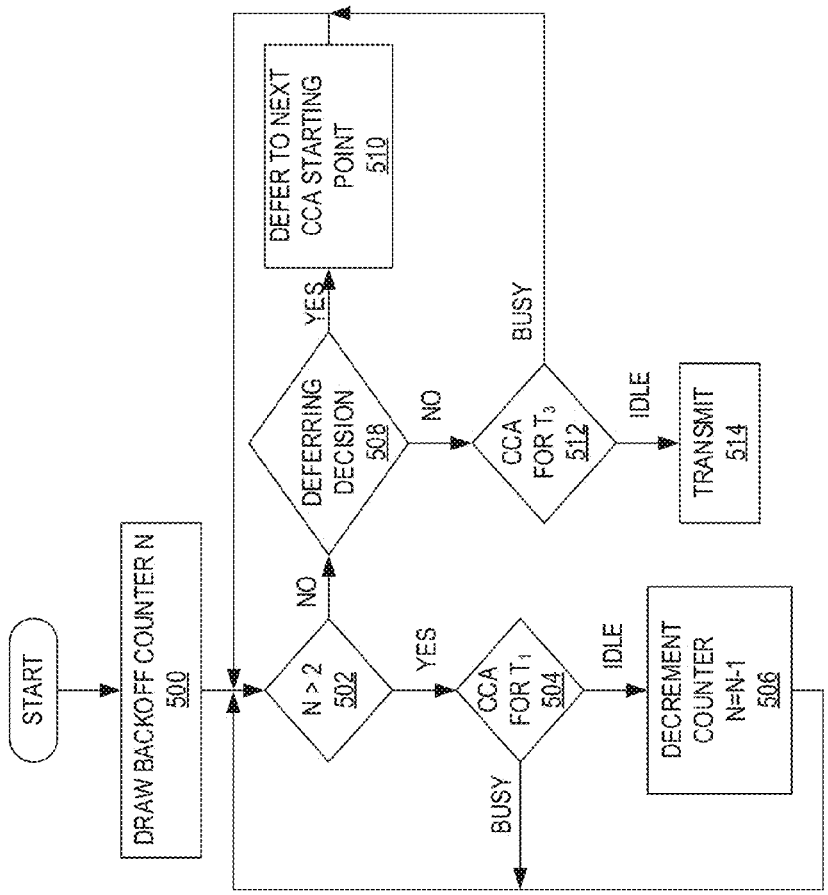
FIG. 19 is a flow chart that illustrates a second version of the second embodiment of the LBT procedure with conditional deferring of selected CCAs according to some embodiments of the present disclosure.

A second version of the second embodiment of the LBT procedure with conditional deferring of selected CCAs is illustrated in FIG. 19. Again, this procedure is performed by the LAA node. In this example, the decision of whether to defer a subset of the last CCAs to the next CCA starting point for example may be made based on the position within the subframe of the last CCA that was found to be busy, or on a combination of one or more of the factors described in the section below titled "Logic for defer decision and determining the CCA starting point."

As illustrated in FIG. 19, the LAA node randomly draws, or selects, a backoff counter N as a value between 1 and q (step 500). The LAA node determines whether the backoff counter N is greater than 2 (step 502). If so, the LAA node observes an observed channel during a CCA slot having a duration $T_1$ (step 504). In other words, the LAA node performs a CCA for the CCA slot having a duration $T_1$. Upon determining that the observed channel is idle during the CCA slot, the LAA node decrements the backoff counter N (step 506), and the procedure then returns to step 502. Conversely, upon determining that the observed channel is busy during the CCA slot, the procedure then returns to step 502 without decrementing the backoff counter N.

Once the LAA node determines that the backoff counter N is equal to 2 (step 502, NO), the LAA node makes a deferring decision as to whether or not the next CCA slot should be deferred (step 508). Notably, the next CCA slot will be the final CCA slot if the observed channel is determined to be idle during that CCA slot. While any suitable criteria or parameters may be used for the deferring decision, generally the deferring decision is such that a decision is made to defer the next CCA slot to a next CCA starting point if doing so is needed in order for the LBT procedure to conclude at or near a desired starting point for the transmission. The decision of whether to defer to the next CCA starting point may, for example, be made based on the position within the subframe of the last CCA that was found to be busy, or on a combination of one or more of the factors in the section below titled "Logic for defer decision and determining the CCA starting point."

Upon making the decision to defer the next CCA slot, the LAA node defers the next CCA slot to a next CCA starting point (step 510) and the procedure then returns to step 502. The next CCA starting point is a desired starting point for the next CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter in N, system load, rate of recent LBT successes, or the like. In general, in some embodiments, the next CCA starting point is such that, if the next CCA slot begins at the next CCA starting point and the observed channel is subsequently determined to be idle for the remaining CCA slot(s) (which in this example would include a CCA slot of duration $T_3$ in step 512), then the LBT procedure concludes at or near a desired starting point for a data transmission on the observed channel.

Returning to step 508, if the decision is made not to defer the next CCA slot (step 508; NO), the LAA node observes the observed channel for a CCA slot of duration $T_3$ (step 512). Upon determining that the observed channel is busy, the procedure returns to step 502 and is repeated. Conversely, upon determining that the observed channel is idle, the LBT procedure concludes, and the LAA node performs transmission (step 514).

LBT Procedure for Management/Control Transmissions

Embodiments of the LBT procedure will now be described that are particularly well-suited for control and/or management transmissions; however, these embodiments are not limited thereto and may be used for any type of transmissions (e.g., data transmissions). Non-limiting examples of management and control information are DRS transmissions, or Master Information Block (MIB) and/or System Information Block (SIB) signals.

In a first embodiment of the LBT procedure for management and control information, transmissions can commence immediately after an initial CCA is cleared. In order to provide priority compared to data transmissions, an example duration for the initial CCA can be $T_0=25$ µs. If the channel is determined to be busy during an initial CCA, the commencement of the next CCA is conditionally deferred to the next CCA starting point, where the deferment decision is based on a combination of one or more factors described in the section below titled "Logic for defer decision and determining the CCA starting point."

Figure 20:
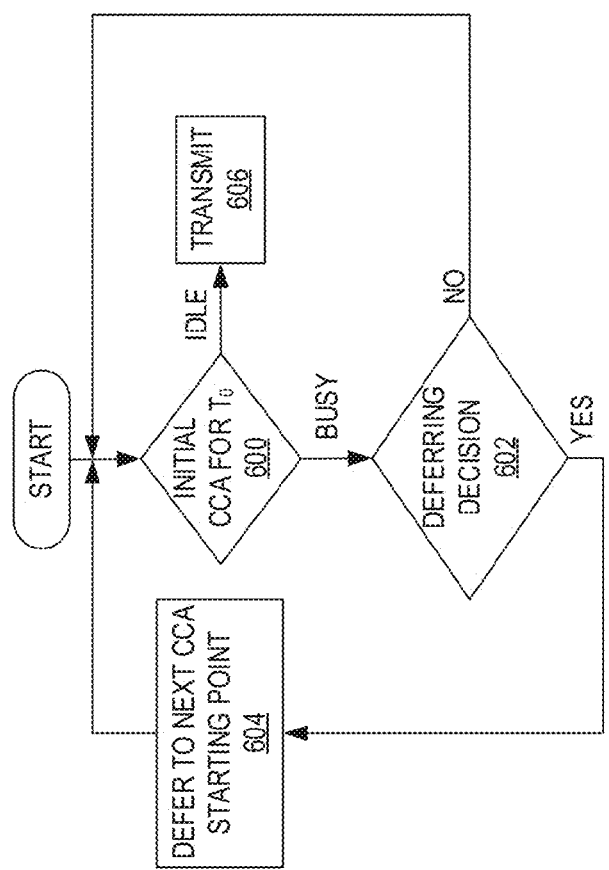
FIG. 20 is a flowchart that illustrates one example of a first embodiment of an LBT procedure for management and control information according to some embodiments of the present disclosure.

FIG. 20 is a flowchart that illustrates one example of the first embodiment of the LBT procedure for management and control information. Again, this procedure is performed by the LAA node. As illustrated, the LAA node observes an observed channel during a CCA slot having a duration $T_0$ (step 600). In other words, the LAA node performs a CCA for the CCA slot having a duration $T_0$. Upon determining that the observed channel is busy during the CCA slot, the LAA node makes a deferring decision as to whether or not the next CCA slot should be deferred (step 602). While any suitable criteria or parameters may be used for the deferring decision, in general, the deferring decision is such that a decision is made to defer the next CCA slot to a next CCA starting point if doing so is needed in order for the LBT procedure to conclude at or near a desired starting point for the transmission. The decision of whether to defer to the next CCA starting point may, for example, be made based on the position within the subframe of the last CCA that was found to be busy, or on a combination of one or more of the factors in the section below titled "Logic for defer decision and determining the CCA starting point."

Upon making the decision to defer the next CCA slot, the LAA node defers the next CCA slot to a next CCA starting point (step 604) and the procedure then returns to step 600. The next CCA starting point is a desired starting point for the next CCA slot. Notably, in some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter N, system load, rate of recent LBT successes, or the like. In general, in some embodiments, the next CCA starting point is such that, if the next CCA slot begins at the next CCA starting point and the observed channel is subsequently determined to be idle for the remaining CCA slot (which in this example would include a CCA slot of duration $T_0$ in step 600), then the LBT procedure concludes at or near a desired starting point for a data transmission on the observed channel. Returning to step 602, if the decision is made not to defer the next CCA slot (step 602; NO), the procedure returns to step 600 and is repeated. Upon determining that the observed channel is idle during the CCA slot of duration $T_0$ (step 600; IDLE), the LBT procedure concludes, in the LAA node performs transmission (step 606).

In another version of this first embodiment of the LBT procedure for management and control information, the starting point of the initial CCA can be deferred before it is performed. For example, in FIG. 20, the deferring decision in step 602 may be performed prior to CCA in step 600.

A second embodiment of the LBT procedure for management and control information includes an extended CCA stage with random back off after initial CCA, for possibly better compliance with EN 301.893 regulations. Here, the management or control information can be transmitted either after the initial CCA is clear, or after the completion of the random backoff stage. This embodiment provides slightly lower priority for the management and control information as compared to the first embodiment of the LBT procedure for management and control information (e.g., the embodiment of FIG. 20). In this embodiment, it is shown that the starting point of CCA for performing LBT for the management and control information can be adjusted. For example, in high-load systems, LBT can start earlier; and, in low-load systems, it can be done later with respect to the desired transmission time.

Figure 21:
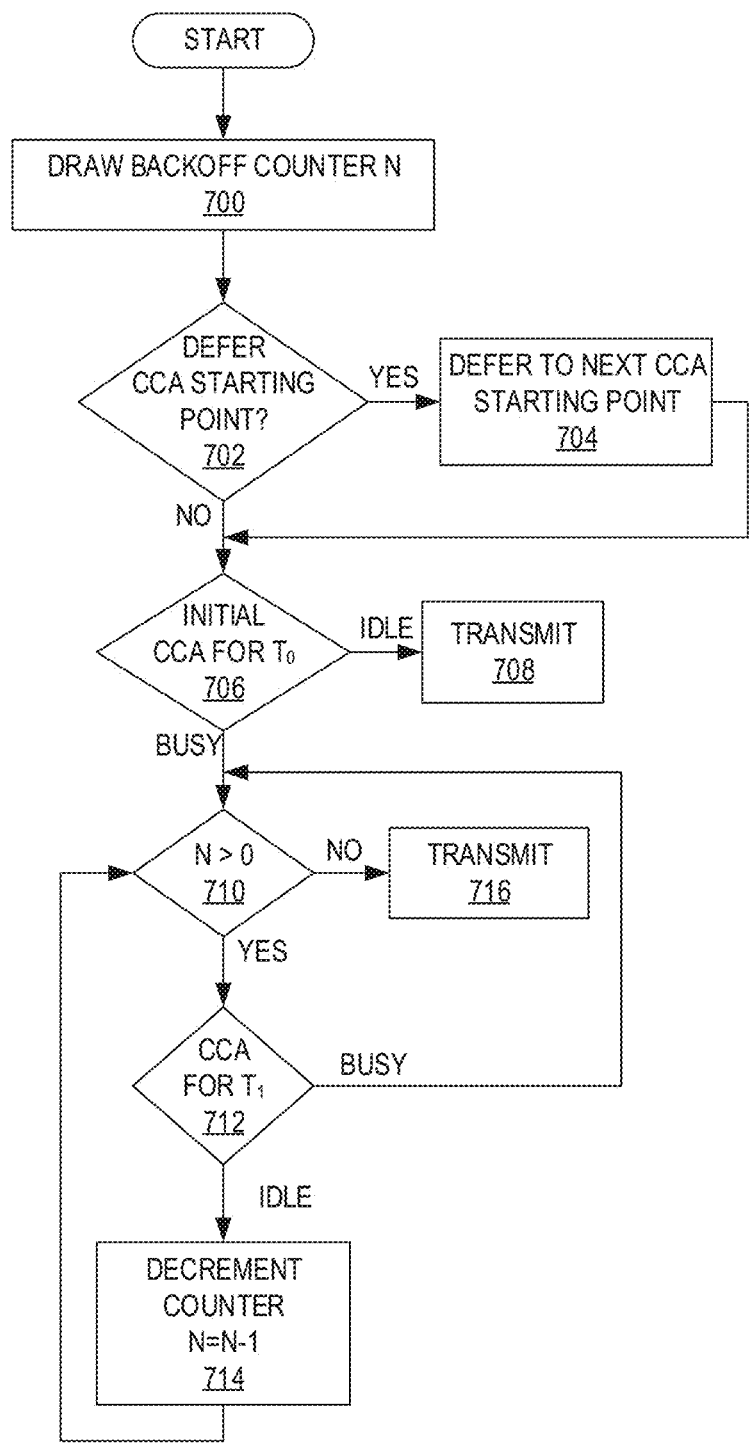
FIG. 21 is a flowchart that illustrates one example of a second embodiment of an LBT procedure for management and control information according to some embodiments of the present disclosure.

One example of the second embodiment of the LBT procedure for management and control information is illustrated in FIG. 21. As illustrated, the LAA node randomly draws, or selects, a backoff counter N as a value between 1 and q (step 700). The LAA node makes a deferring decision as to whether or not an initial CCA slot should be deferred (step 702). While any suitable criteria or parameters may be used for the deferring decision, in general, the deferring decision is such that a decision is made to defer to the initial CCA slot to a next CCA starting point if doing so is needed in order for the LBT procedure to conclude at or near a desired starting point for the transmission. The decision of whether to defer to the next CCA starting point may, for example, be made based on a combination of one or more of the factors in the section below titled "Logic for defer decision and determining the CCA starting point."

Upon making the decision to defer the initial CCA slot, the LAA node defers the initial CCA slot to a next CCA starting point (step 704) and the procedure then proceeds to step 706. The next CCA starting point is a desired starting point for the initial CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., a current value of the backoff counter N, system load, rate of recent LBT successes, or the like. In general, in some embodiments, the next CCA starting point is such that, if the initial CCA slot begins at the next CCA starting point and the observed channel is subsequently determined to be idle for all remaining CCA slots, then the LBT procedure concludes at or near a desired starting point for a data transmission on the observed channel.

Upon making the decision not to defer the initial CCA slot (step 702; NO) or after deferring to the next CCA starting point upon making the decision to defer the initial CCA slot, the LAA node observes the observed channel during an initial CCA slot having a duration $T_0$ (step 706). In other words, the LAA node performs a CCA for the CCA slot having a duration $T_0$. Upon determining that the observed channel is idle, the LBT procedure concludes, and the LAA node performs the transmission (step 708).

Conversely, upon determining that the observed channel is busy in step 706, the LAA node performs an extended backoff stage of the LBT procedure. More specifically, in this embodiment, the LAA node determines whether the backoff counter N is greater than zero (step 710). If so, the LAA node observes the observed channel during a CCA slot having a duration $T_1$ (step 712). In other words, the LAA node performs a CCA for the CCA slot having a duration $T_1$. The duration $T_1$ is, in some embodiments, different than (e.g., less than) the duration $T_0$; however, in other embodiments, the durations $T_0$ and $T_1$ are the same. Upon determining that the observed channel is busy during the CCA slot, the LAA node returns to step 710 without decrementing the backoff counter N. Conversely, upon determining that the observed channel is idle during the CCA slot, the LAA node decrements the backoff counter N (step 714), and the procedure then returns to step 710. Once the LAA node determines that the observed channel has been idle for N CCA slots (i.e., when the backoff counter N is equal to zero) (step 710, NO), the LBT procedure concludes, and the LAA node performs the transmission (step 716).

In a third embodiment of the LBT procedure for management and control information, the LBT procedure contains an extended CCA stage with random backoff, where, if the channel is observed to be busy during the initial CCA, the starting point of the extended CCA can be deferred. The decision of whether to defer to the next CCA starting point, for example, may be made based on the position within the subframe of the last CCA that was found to be busy.

Figure 22:
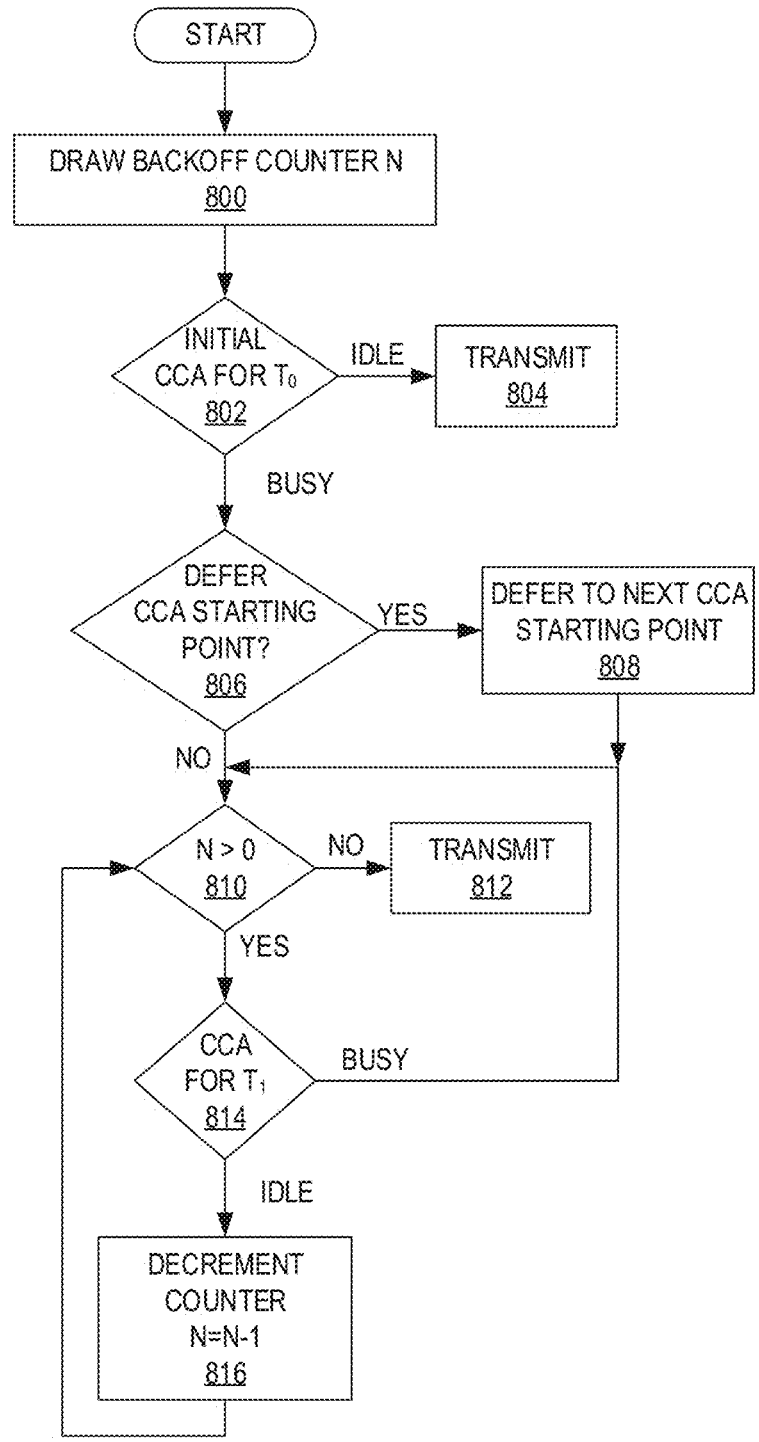
FIG. 22 is a flowchart that illustrates an LBT procedure for management and control information according to a third embodiment.

FIG. 22 is a flowchart that illustrates the LBT procedure for management and control information according to the third embodiment described above. As illustrated, the LAA node randomly draws, or selects, the backoff counter N as a value between 1 and q (step 800). The LAA node observes an observed channel during an initial CCA slot having a duration $T_0$ (step 802). In other words, the LAA node performs a CCA for the CCA slot having a duration $T_0$. Upon determining that the observed channel is idle, the LBT procedure concludes, and the LAA node performs the transmission (step 804). Conversely, upon determining that the observed channel is busy, the LAA node makes a deferring decision as to whether or not the next CCA slot should be deferred (step 806). While any suitable criteria or parameters may be used for the deferring decision, in general, the deferring decision is such that a decision is made to defer the next CCA slot to a next CCA starting point if doing so is needed in order for the LBT procedure to conclude at or near a desired starting point for the transmission. The decision of whether to defer to the next CCA starting point may, for example, be made based on a combination of one or more of the factors in the section below titled "Logic for defer decision and determining the CCA starting point."

Upon making the decision to defer the next CCA slot, the LAA node defers the next CCA slot to a next CCA starting point (step 808) and the procedure then proceeds to step 810. The next CCA starting point is a desired starting point for the next CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., a current value of the backoff counter N, system load, rate of recent LBT successes, or the like. In general, in some embodiments, the next CCA starting point is such that, if the next CCA slot begins at the next CCA starting point and the observed channel is subsequently determined to be idle for all remaining CCA slots, then the LBT procedure concludes at or near a desired starting point for a data transmission on the observed channel.

Upon making the decision not to defer the next CCA slot (step 806; NO) or after deferring to the next CCA starting point upon making the decision to defer the next CCA slot, the LAA node performs an extended backoff stage of the LBT procedure. More specifically, in this embodiment, the LAA node determines whether the backoff counter N is greater than zero (step 810). If so, the LAA node observes the observed channel during a CCA slot having a duration $T_1$ (step 814). In other words, the LAA node performs a CCA for the CCA slot having a duration $T_1$. The duration $T_1$ is, in some embodiments, different than (e.g., less than) the duration $T_0$; however, in other embodiments, the durations $T_0$ and $T_1$ are the same. Upon determining that the observed channel is busy during the CCA slot, the LAA node, without decrementing the backoff counter N, defers the next CCA slot to the next CCA starting point (step 808), the procedure then returns to step 810. Conversely, upon determining that the observed channel is idle during the CCA slot, the LAA node decrements the backoff counter N (step 816), and the procedure then returns to step 810. Once the LAA node determines that the observed channel has been idle for N CCA slots (i.e., when the backoff counter N is equal to zero) (step 810, NO), the LBT procedure concludes, and the LAA node performs the transmission (step 812).

Figure 23:
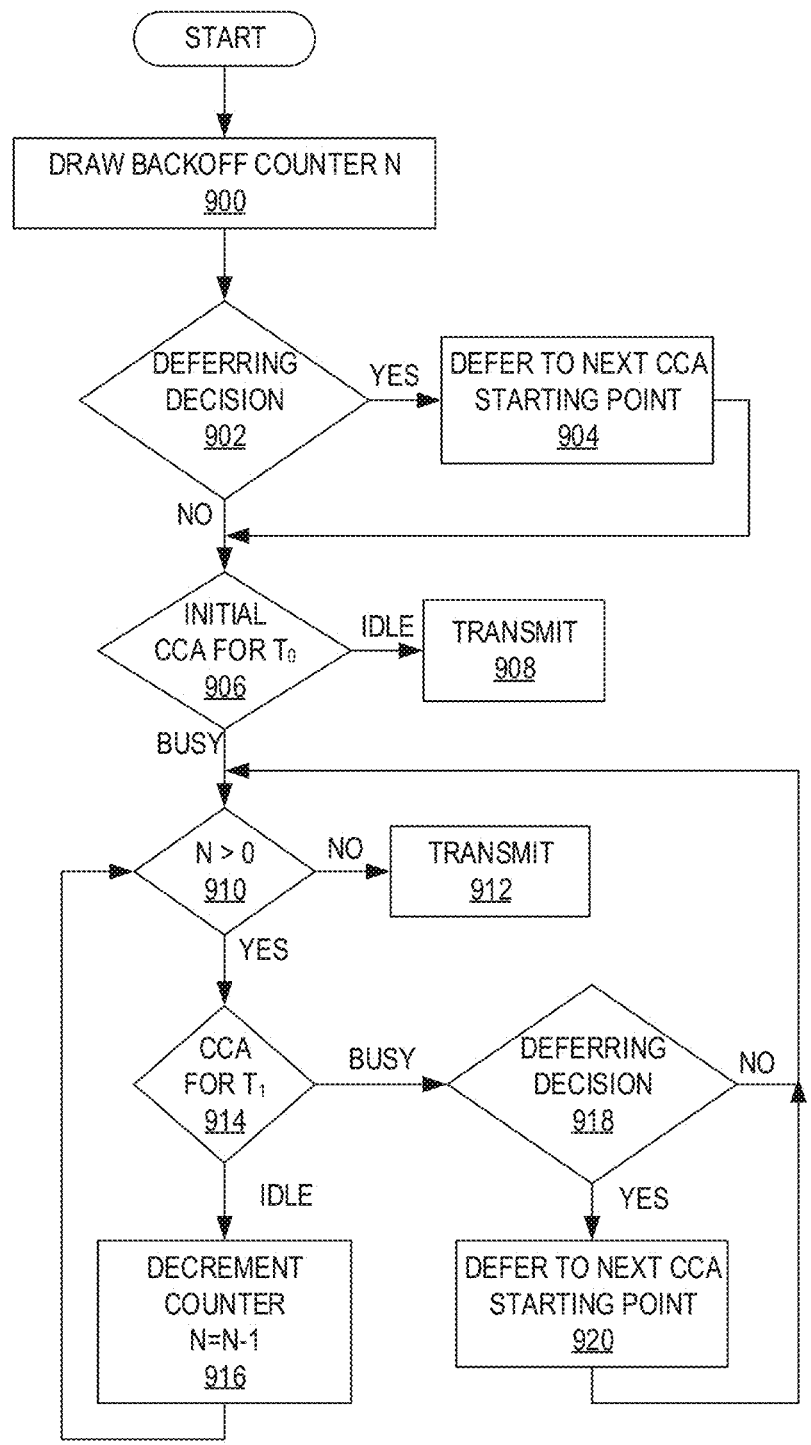
FIG. 23 is a flowchart that illustrates an LBT procedure for management and control information according to some other embodiments of the present disclosure.

In another embodiment of the LBT procedure for management and control information, the LBT procedure is a combination of the previous two embodiments where the starting time for both initial CCA and extended CCA can be deferred independently. One example of this embodiment is illustrated in FIG. 23. As illustrated, the LAA node randomly draws, or selects, a backoff counter N as a value between 1 and q (step 900). The LAA node makes a deferring decision as to whether or not an initial CCA slot should be deferred (step 902). While any suitable criteria or parameters may be used for the deferring decision, in general, the deferring decision is such that a decision is made to defer to the initial CCA slot to a next CCA starting point if doing so is needed in order for the LBT procedure to conclude at or near a desired starting point for a transmission. The decision of whether to defer to the next CCA starting point may, for example, be made based on a combination of one or more of the factors in the section below titled "Logic for defer decision and determining the CCA starting point."

Upon making the decision to defer the initial CCA slot, the LAA node defers the initial CCA slot to a next CCA starting point (step 904) and the procedure then proceeds to step 906. The next CCA starting point is a desired starting point for the initial CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter N, system load, rate of recent LBT successes, or the like. In general, in some embodiments, the next CCA starting point is such that, if the initial CCA slot begins at the next CCA starting point and the observed channel is subsequently determined to be idle for all remaining CCA slots, then the LBT procedure concludes at or near a desired starting point for a data transmission on the observed channel.

Upon making the decision not to defer the initial CCA slot (step 902; NO) or after deferring to the next CCA starting point upon making the decision to defer the initial CCA slot (step 904), the LAA node observes the observed channel during an initial CCA slot having a duration $T_0$ (step 906). In other words, the LAA node performs a CCA for the CCA slot having a duration $T_0$. Upon determining that the observed channel is idle, the LBT procedure concludes, and the LAA node performs the transmission (step 908).

Conversely, upon determining that the observed channel is busy in step 906, the LAA node performs an extended backoff stage of the LBT procedure. More specifically, in this embodiment, the LAA node determines whether the backoff counter N is greater than zero (step 910). If so, the LAA node observes the observed channel during a CCA slot having a duration $T_1$ (step 914). In other words, the LAA node performs a CCA for the CCA slot having a duration $T_1$. The duration $T_1$ is, in some embodiments, different than (e.g., less than) the duration $T_0$; however, in other embodiments, the durations $T_0$ and $T_1$ are the same.

Upon determining that the observed channel is idle during the CCA slot, the LAA node decrements the backoff counter N (step 916), and the procedure then returns to step 910. Once the LAA node determines that the observed channel has been idle for N CCA slots (i.e., when the backoff counter N is equal to zero) (step 910, NO), the LBT procedure concludes, and the LAA node performs the transmission (step 912).

Conversely, upon determining in step 914 that the observed channel is busy during the CCA slot, the LAA node, without decrementing the backoff counter N, makes a deferring decision as to whether or not the next CCA slot should be deferred (step 918). While any suitable criteria or parameters may be used for the deferring decision, in general, the deferring decision is such that a decision is made to defer the next CCA slot to a next CCA starting point if doing so is needed in order for the LBT procedure to conclude at or near a desired starting point for the transmission. The decision of whether to defer to the next CCA starting point may, for example, be made based on a combination of one or more of the factors in the section below titled "Logic for defer decision and determining the CCA starting point."

Upon making the decision to defer the next CCA slot, the LAA node defers the next CCA slot to a next CCA starting point (step 920) and the procedure then proceeds to step 910. The next CCA starting point is a desired starting point for the next CCA slot. Notably, some embodiments, desired CCA slots are predefined or predetermined, e.g., relative to subframe and/or slot boundaries. In other embodiments, the next CCA starting point is determined by the LAA node based on one or more factors such as, e.g., the current value of the backoff counter N, system load, rate of recent LBT successes, or the like. In general, in some embodiments, the next CCA starting point is such that, if the next CCA slot begins at the next CCA starting point and the observed channel is subsequently determined to be idle for all remaining CCA slots, then the LBT procedure concludes at or near a desired starting point for the data transmission on the observed channel. Upon making the decision not to defer the next CCA slot (step 918; NO), the procedure then proceeds to step 910.

LBT Procedure for Multi-Carrier Operation

In some embodiments, the LAA node transmits on multiple unlicensed carriers according to a multi-carrier operation scheme such as, for example, a CA scheme. In a first embodiment of the LBT procedure for multi-carrier operation, the LAA node performs an LBT procedure per carrier for all carriers on which the LAA node is about to transmit. In other words, the LAA node performs a separate LBT procedure for each carrier on which the LAA node is about to transmit. For each carrier, the LAA node could use, for example, any of the embodiments of the LBT procedure described above.

Figure 24:
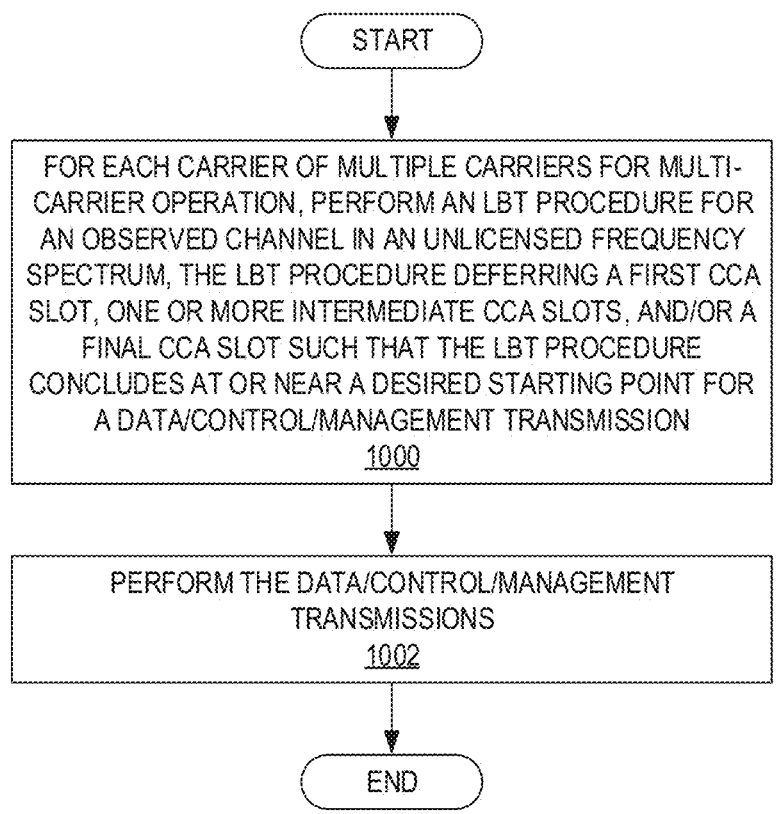
FIG. 24 illustrates the operation of an LAA node to perform an LBT procedure per carrier for multicarrier operation according to some embodiments of the present disclosure.

In this regard, FIG. 24 illustrates the operation of an LAA node to perform an LBT procedure per carrier for multicarrier operation according to some embodiments of the present disclosure. Each of the carriers for multi-carrier operation is in an unlicensed frequency spectrum. The carriers may be in the same unlicensed frequency spectrum or different unlicensed frequency spectrums. As illustrated, for each carrier for multi-carrier operation (e.g., for each carrier of multiple carriers on which the LAA node is about transmit), the LAA node performs an LBT procedure for an observed channel for the carrier (1000). The LBT procedure may, for example, be any of the embodiments of the LBT procedure described above. In general, as described above, the LBT procedure defers one or more select CCA slots, which are referred to as deferred CCA slots. The one or more deferred CCA slots include a first CCA slot of the LBT procedure, one or more intermediate CCA slots of the LBT procedure, and/or a final CCA slot of the LBT procedure. The LBT procedure defers the one or more CCA slots such that the LBT procedure for the carrier concludes at or near a desired starting point for a data/control/management transmission for the carrier. For each carrier, at the conclusion of the LBT procedure, the LAA node has determined in the observed channel is idle and, as such, performs the data/control/management transmission on the observed channel (step 1002).

In some embodiments, for multi-carrier operation, the LAA node performs LBT procedures for the carriers on which it is about to transmit in a coordinated manner such that the LBT procedures for the different carriers all conclude at or about the same time, where this time is at or near a desired starting point for multi-carrier transmission (e.g., all LBT procedures conclude within 1 or a few OFDM symbols periods from the desired starting point for multi-carrier transmission).

Figure 25:
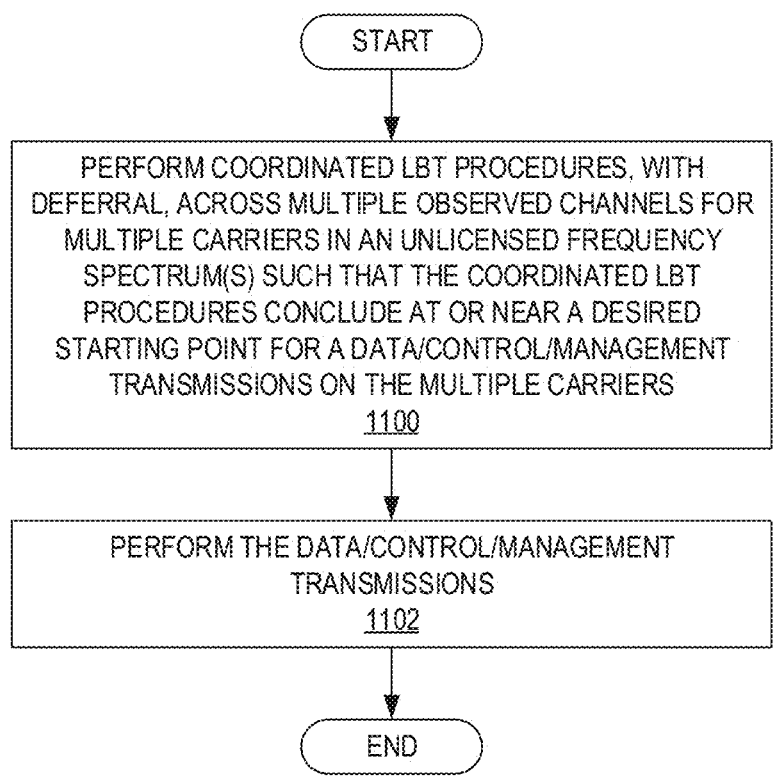
FIG. 25 illustrates the operation of an LAA node to perform LBT procedures for multiple carriers in a coordinated manner according to some embodiments of the present disclosure.

In this regard, FIG. 25 illustrates the operation of an LAA node to perform LBT procedures for multiple carriers in a coordinated manner according to some embodiments of the present disclosure. As illustrated, the LAA node performs coordinated LBT procedures across multiple carriers for observed channels for the multiple carriers (1100). The LBT procedures may, for example, be any of the embodiments of the LBT procedure described above. In general, as described above, the LBT procedures defer one or more select CCA slots, which are referred to as deferred CCA slots. The one or more deferred CCA slots include a first CCA slot of the LBT procedure, one or more intermediate CCA slots of the LBT procedure, and/or a final CCA slot of the LBT procedure. The LBT procedures defer the one or more CCA slots such that the LBT procedures for the multiple carriers concludes at or near a desired starting point for a data/control/management transmission for the respective carriers. Further, the LBT procedures are performed in a coordinated manner such that they conclude at or near the same time (i.e., at or near the same desire starting point for data/control/management transmission multi-carrier operation). At the conclusion of the LBT procedures, the LAA node has determined that the observed channels are idle and, as such, performs the data/control/management transmissions on the observed channels (step 1102).

In some other embodiments of the LBT for multi-carrier operation, the LAA node that is about to transmit data applies the LBT procedure for data in accordance any of the embodiments described above in the section titled "LBT Procedure for Data Transmissions" on a single carrier that the LAA node is about to use (referred to herein as the master carrier). On at least one other carrier that the LAA is supposed to transmit on (referred to herein as a slave or secondary carrier), the LAA node uses the LBT procedure illustrated in FIG. 26. The initial CCA duration $T_0$ on the slave carrier is aligned with the last CCA duration of the master carrier. In this manner, the LBT procedures for the master carrier and the slave carrier are coordinated such that the LBT procedures include at or near the same time. If the slave carrier is found to be idle, the LAA node may use the slave carrier for transmission. If the slave carrier is not found to be idle, the LAA node will not use the slave carrier for transmission.

Figure 26:
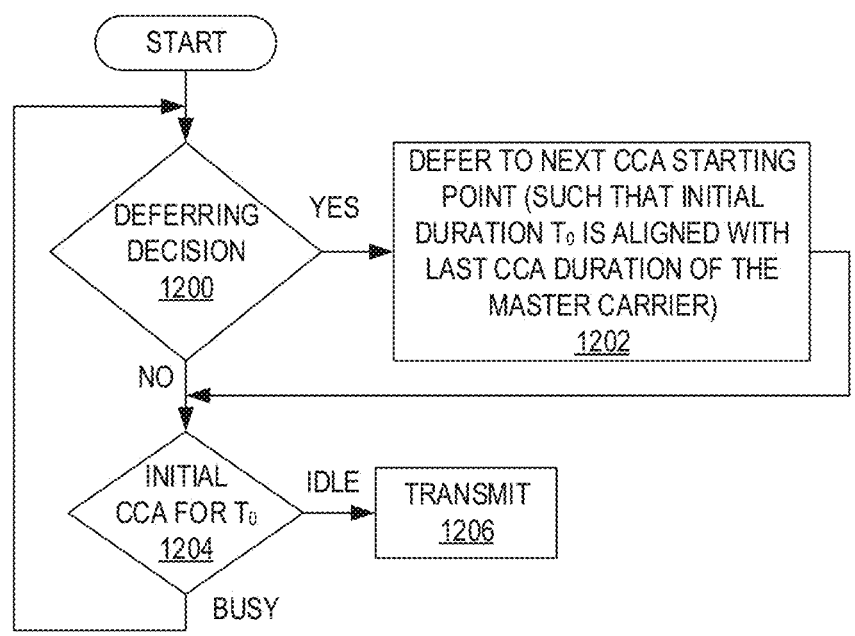
FIG. 26 illustrates an LBT procedure for a secondary carrier according to some embodiments of the present disclosure.

More specifically, as illustrated in FIG. 26, the LAA node makes a deferring decision for the slave carrier (step 1200). Here, the deferring decision is a decision as to whether an initial CCA slot for the observed channel for the slave carrier needs to be deferred in order for the initial CCA slot to be aligned with (in time) the last, or final, CCA slot for the LBT procedure for the observed channel for the master carrier. Upon making the decision that the initial CCA slot for the observed channel for the secondary carrier needs to be deferred, the LAA node defers the initial CCA slot to the next CCA starting point (step 1202). In this manner, the initial CCA slot is time-aligned with the last CCA slot for the LBT procedure for the observed channel for the master carrier.

Upon making the decision that deferral is not needed or after deferring the initial CCA slot upon making the decision that deferral is needed, the LAA node observes the observed channel for the secondary carrier for the initial duration $T_0$ (step 1204). Upon determining that the observed channel is idle, the LBT procedure for the slave carrier concludes, and the LAA node performs the transmission on the slave carrier (step 1206). Conversely, upon determining that the observed channel is busy, the procedure returns to step 1200.

A LAA node could either be a UE, eNB or relay.

LBT Procedure with Quality of Service (QoS) Classes

In another embodiment, the LBT procedure may support data with different Quality of Service (QoS) requirements for LAA. In a first embodiment, in the downlink, when several bearers are to be transmitted to a UE, a weight w is calculated at the eNB (or LAA node) for each bearer, based on the associated QoS Class Identifier (QCI) and scheduling algorithm, e.g., proportional fair or round-robin scheduling. The weight w is then input to the scheduler for downlink scheduling decision for the bearer to be transmitted to the UE. If the bearer of the UE is scheduled to be transmitted from the eNB on subframe n on a LAA cell in an unlicensed spectrum, the weight is mapped to a certain LBT setting including the LBT algorithm and its corresponding parameters such as CCA starting points in time. Note that the weight w could be a range of values where different weights correspond to non-overlapping ranges of values.

In a second embodiment, in UL, for a UE with data to be transmitted to an eNB, a weight w is calculated at the eNB based on the reported QCIs from the UE and scheduling algorithm, e.g., proportional fair or round-robin scheduling. The weight w is then input to the scheduler for uplink scheduling decision for the UE. If the UE is scheduled for uplink transmission on subframe n on a LAA cell in unlicensed spectrum, the weight is mapped to a certain LBT setting including the LBT algorithm and its corresponding parameters, for example, the initial CCA sensing time, extended CCA sensing time, CCA starting points, and range of random backoff number for extended CCA, etc.

For both embodiments above, physical and Medium Access Control (MAC) layer control messages that are not normally associated with a bearer can also be given a pseudo-QCI so that the LBT procedure can accommodate the transmission of such messages into the prioritization scheme. In an exemplary version of this embodiment, such messages may be given a QCI of 0 with a priority of 0, i.e., higher than any other type of services. In another variation of the embodiment, different control messages may have different priorities.

Figure 27:
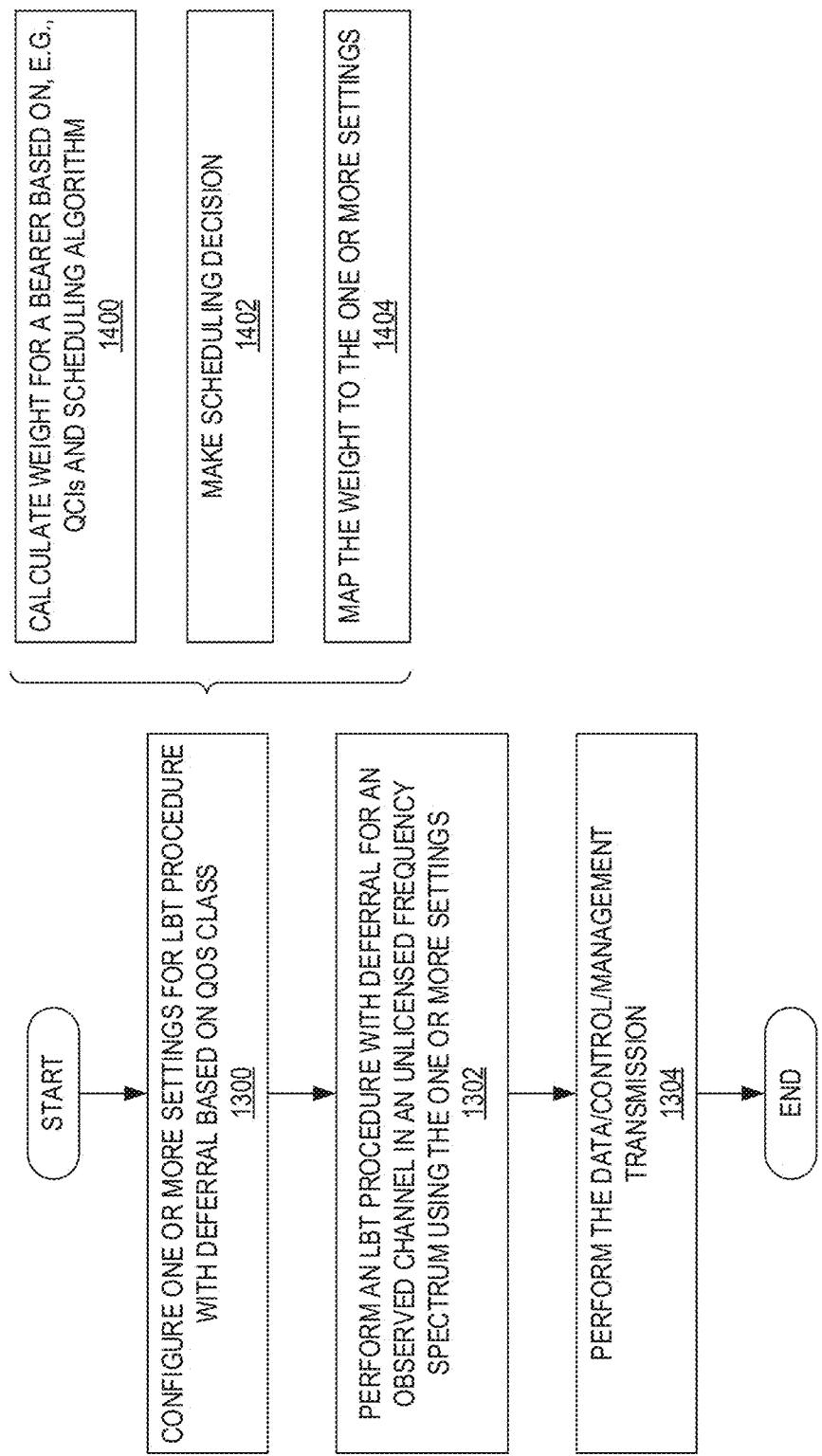
FIG. 27 illustrates an LBT procedure with Quality of Service (QoS) classes according to some embodiments of the present disclosure.

FIG. 27 illustrates some examples of the embodiments described above for the LBT procedure with QoS classes. As illustrated, an LAA node configures one or more settings for an LBT procedure with CCA deferral based on a QoS class of an associated bearer to be transmitted on the observed channel (step 1300). The one or more settings for LBT procedure may include, for example, whether or not CCA deferral is to be applied, duration(s) to be used for the CCA slots, desired CCA starting points, and/or a range of random backoff number values. The LAA node then performs the LBT procedure using the one or more settings configured based on the QoS class of the associated bearer (step 1302). Once LBT procedure concludes (i.e., once the observed channel is determined to be idle according to the LBT procedure), the LA node performs the data/management/control transmission on the observed channel (step 1304). This transmission uses the associated bearer having the QoS class used to configure the LBT settings.

FIG. 27 also illustrates one example of a procedure for configuring the one or more settings for the LBT procedure with CCA deferral based on a QoS class of an associate bearer to be transmitted on the observed channel according to some embodiments of the present disclosure. Notably, in this example, the node that configures the one or more settings for the LBT procedure is also the LAA node; however, the present disclosure is not limited thereto. For example, for the uplink scenario, the LAA node is the UE, or wireless device, and the node that configures the one or more settings for LBT procedure may be, for example, the base station. As illustrated, in order to configure the one or more settings for the LBT procedure, the node calculates a weight for the associated bearer based on one or more parameters such as, e.g., associated/reported QCIs and scheduling algorithm, as described above (step 1400). In this example, the node makes a scheduling decision for the transmission by the LAA node (step 1402). The node also maps the calculated weight for the associated bearer to the one or more settings for the LBT procedure (step 1404). Notably, the mapping between the calculated weight and one or more settings for the LBT procedure may be predefined by, e.g., the network operator or by a standard.

Logic for Defer Decision and determining the CCA Starting Point

In an LBT protocol, there could be default values for starting the LBT procedure as well as each CCA operation within the LBT procedure. For example, the LBT procedure and, hence initial CCA, discussed in the embodiments described above can start at a subframe boundary, but are not limited thereto.

As discussed herein, the starting point of CCA can be deferred. The decision to defer the starting point of CCA can be based on different factors as well as the amount of defer, i.e. the time that the next CCA starts. For example:

Based on the position within the subframe of the last CCA that was found to be busy. For example, if the medium is found busy at the beginning of the subframe, the next CCA slot may be deferred to a subsequent (e.g., the next) subframe. As another example, if the medium is found to be busy in the middle of the subframe, the next CCA slot may be deferred to a subsequent (e.g., the next) subframe.

Based on how many consecutive failed LBT opportunities or successful LBT opportunities have occurred. For example, for transmission of management and control information, the starting time of a new LBT procedure can be deferred and updated based on what happened in previous, corresponding LBT attempts. For example, LBT may be started 1 ms earlier after 1 missed opportunity, 2 ms earlier after 2 missed opportunities, etc. The increment could be values other than 1 ms, e.g., 0.5 ms.

Based on the system loads. LBT may be started earlier at higher loads than at lower loads.

Based on detecting other LTE signal(s) when the channel is busy, the CCA can be deferred at least to a subsequent (e.g., the next) subframe based on the granularity of 1 ms of LTE transmissions.

Uplink based LBT

The above embodiments are applicable for an uplink as well as a downlink. In the uplink, the LBT procedure is applicable for signals and channels transmitted in the uplink such as, for example, PUSCH, Sounding Reference Signal (SRS), Physical Random Access Channel (PRACH), and Physical Uplink Control Channel (PUCCH). In the uplink, the base station (i.e., eNB for LTE) may configure the UE to apply LBT with CCA deferral or not. Further, in a scheduling assignment, i.e. uplink grant, the base station may indicate to the UE that the UE should or should not regenerate a new random seed. If it is indicated to the UE that the UE should continue without generating a new random seed, the UE will apply the embodiments above. The indication can be performed by a bit or bitfield in the DCI message. The procedure could also be different than the PUSCH transmission or an aperiodic SRS.

Network Configuration of LBT

Figure 28:
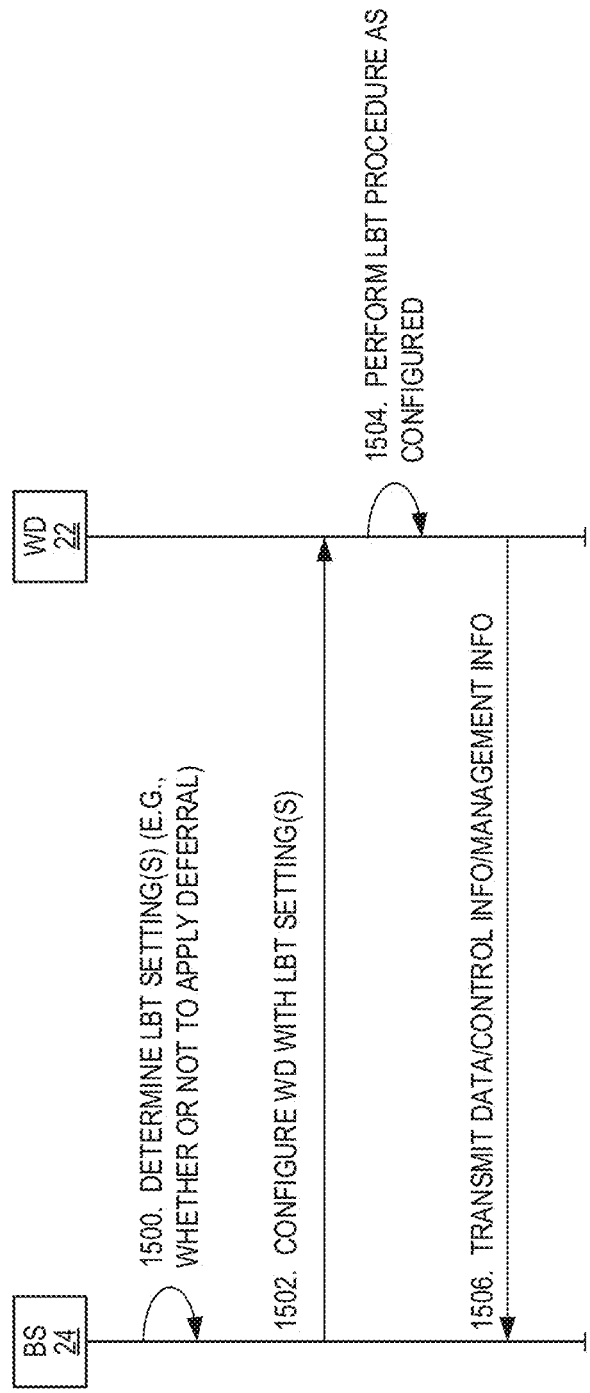
FIG. 28 illustrates the operation of a base station to configure LBT for the uplink from a wireless device in an unlicensed frequency spectrum according to some embodiments of the present disclosure.

As discussed above, in some embodiments, LBT performed by the UE 22 (which may more generally be a wireless device) may be configured by a network node such as, for example, a base station. This configuration may be for LBT in general or for LBT with CCA deferral according to, for example, any of the embodiments described above. In this regard, FIG. 28 illustrates the operation of a base station 24 to configure LBT for the uplink from the wireless device 22 in an unlicensed frequency spectrum according to some embodiments of the present disclosure. The base station 24 may be, for example, a macro base station such as the macro base stations 12 of FIG. 13 or a low power base station such as the low power nodes 16 of FIG. 13.

As illustrated, the base station 24 determines one or more settings for LBT for the uplink from the wireless device 22 (step 1500). The one or more settings for LBT may, for example, be determined based on QoS of an associated bearer, but is not limited thereto. The one or more settings for LBT may include, for example, whether or not to apply CCA deferral, the duration(s) of CCA slots, desired CCA starting points, a range of values for the backup counter N, and/or the like. The base station 24 then configures the wireless device 22 with one or more settings for LBT (step 1502). The wireless device 22 then performs an LBT procedure according to the one or more settings (step 1504). At the conclusion of the LBT procedure, the wireless device 22 performs transmission of the data/management/control information (step 1506). Importantly, the procedure of FIG. 28 is not limited to configuration of one or more settings for LBT with CCA deferral; rather, the procedure is equally applicable to configuration of one more settings for any type of LBT procedure.

Figure 29:
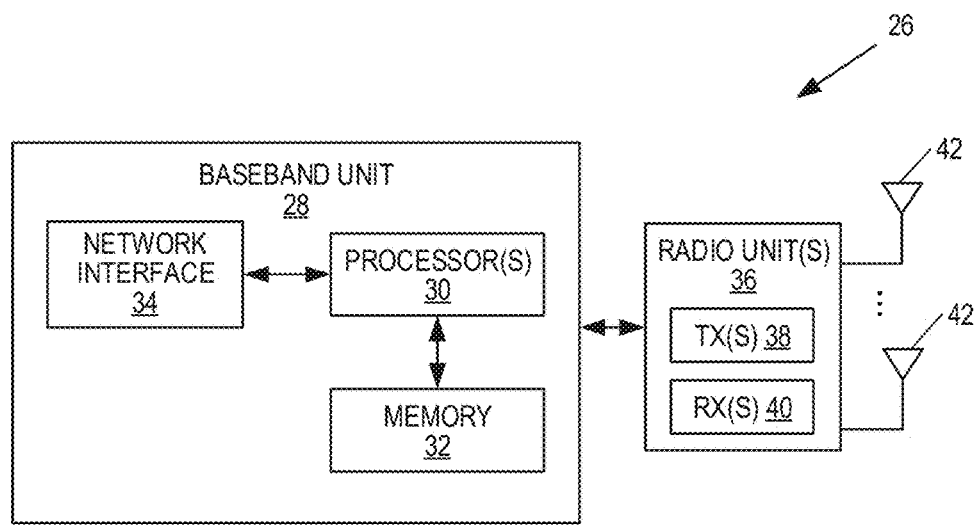
FIG. 29 is a block diagram of a radio access node according to some embodiments of the present disclosure.

FIG. 29 is a block diagram of a radio access node 26 (e.g., the macro base station 12 or the low power node 16) according to some embodiments of the present disclosure. As illustrated, the radio access node 26 includes, in this example, a baseband unit 28 including one or more processors 30 (e.g., one or more Central Processing Units (CPUs), one or more Application Specific Integrated Circuits (ASICs), one or more Field Programmable Gate Arrays (FPGAs), and/or the like), memory 32, and a network interface 34. The radio access node 26 also includes one or more radio units 36 including one or more transmitters 38 and one or more receivers 40 connected to one or more antennas 42. In some embodiments, the functionality of the LAA node described herein is implemented in software that is stored in, e.g., the memory 32 and executed by the processor(s) 30.

Figure 30:
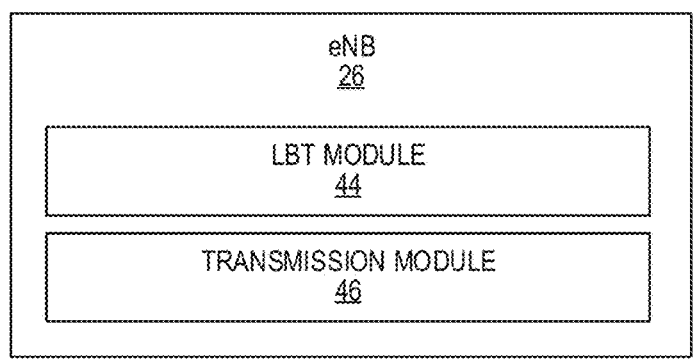
FIG. 30 is a block diagram of a radio access node according to some other embodiments of the present disclosure.

FIG. 30 is a block diagram of the eNB 26 according to some other embodiments of the present disclosure. This discussion is more generally applicable to any radio access node. As illustrated, in this example, the eNB 26 includes an LBT module 44 and a transmission module 46, each of which is implemented in software. The LBT module 44 operates to perform LBT procedures according to any of the embodiments described herein. The transmission module 46 operates to transmit (via an associated transmitter(s) of the radio access node 26, not shown) in an unlicensed frequency band according to the LBT procedures performed by the LBT module 44, as described above.

Figure 31:
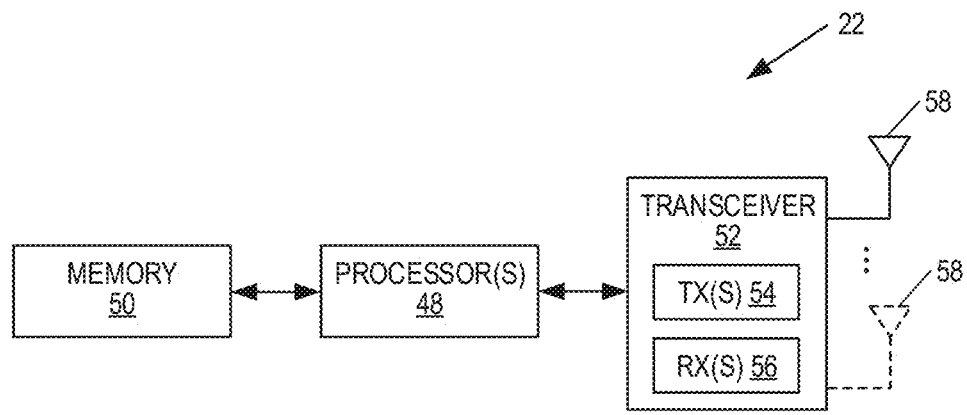
FIG. 31 is a block diagram of a User Equipment (UE) according to some embodiments of the present disclosure.

FIG. 31 is a block diagram of the UE 22 according to some embodiments of the present disclosure. As illustrated, the UE 22 includes one or more processors 48 (e.g., one or more CPUs, one or more ASICs, one or more FPGAs, and/or the like), memory 50, and a transceiver 52 including one or more transmitters 54 and one or more receivers 56 connected to one or more antennas 58. In some embodiments, the functionality of the LAA node described herein is implemented in software that is stored, e.g., in memory 50 and executed by the processor(s) 48.

Figure 32:
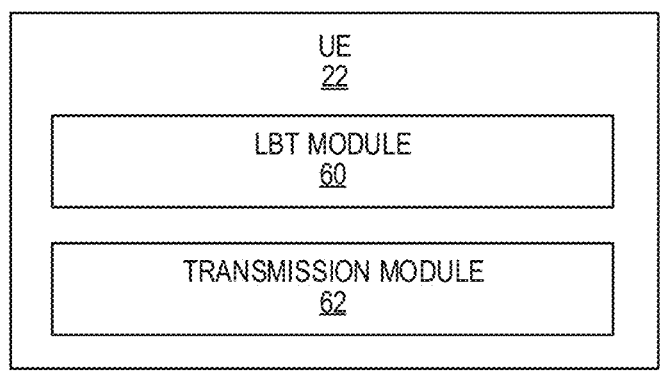
FIG. 32 is a block diagram of a UE according to some other embodiments of the present disclosure.

FIG. 32 is a block diagram of the UE 22 according to some other embodiments of the present disclosure. As illustrated, the UE 22 includes an LBT module 60 and a transmission module 62, each of which is implemented in software. The LBT module 60 operates to perform LBT procedures according to any of the embodiments described herein. The transmission module 62 operates to transmit (via an associated transmitter(s) of the UE 22, not shown) in an unlicensed frequency band according to the LBT procedures performed by the LBT module 60, as described above.

In some embodiments, a computer program including instructions which, when executed by at least one processor, causes the at least one processor to carry out the functionality of the LAA node according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

While not being limited to or by any particular advantage(s), the following advantages have been identified. At least in some embodiments, selected CCA instances can be deferred to particular time instances which minimize the duration of any channel reservation signals, and also facilitate transmission of complete or near-complete subframes. At least in some embodiments, proper selection of CCA instances can save a node performing LBT from unnecessary CCA operations which can result in a more efficient LBT operation by reducing the power consumption. At least in some embodiments, LAA LTE can coexist with Wi-Fi, as well as with adjacent LAA LTE cells. At least in some embodiments, standalone LTE in license-exempt channels can coexist with Wi-Fi, as well as with adjacent LTE cells employing LBT. At least in some embodiments, LTE management and control information transmissions are provided priority over LTE data transmissions. At least in some embodiments, Wi-Fi beacon transmissions are allowed a greater priority in accessing the channel by LAA.

The following acronyms are used throughout this disclosure.

3GPP 3$^{rd}$ Generation Partnership Project
ACK Acknowledgement
AP Access Point
ARQ Automatic Repeat Request
ASIC Application Specific Integrated Circuit
BRAN Broadband Radio Access Networks
CA Carrier Aggregation
CC Component Carrier
CCA Clear Channel Assessment
CIF Carrier Indicator Field
CF Contention Free
CFI Control Format Indicator
CFP Contention-Free Period
CPU Central Progressing Unit
CRC Cyclic Redundancy Check
CRS Cell Reference Signals
CSMA/CA Carrier Sense Multiple Access with Collision Avoidance
DCI Downlink Control Information
DRS Demodulation Reference Signal
DIFS Distributed Inter-Frame Space
DFT Discrete Fourier Transform
eNB Evolved Node B
EPDCCH Enhanced Physical Downlink Control Channel
FDD Frequency Division Duplexing
FDMA Frequency Division Multiple Access
FPGA Field Programmable Gate Arrays
IEEE Institute of Electrical and Electronics Engineers
LAA Licensed Assisted Access
LAA SCell Licensed Assisted Access Secondary Cell
LBT Listen Before Talk
LTE Long-Term Evolution
LTE-U Long-Term Evolution—Unlicensed
MAC Medium Access Control
MIB Master Information Block
ms milliseconds
μs microseconds
OFDM Orthogonal Frequency Divisional Multiplexing
PC Point Coordinator
PCell Primary Cell
PCF Point Coordination Function
PCID Primary Cell Identifier
PDCCH Physical Downlink Control Channel
PDSCH Physical Downlink Shared Channel
PIFS Inter-Frame Space
PUSCH Physical Uplink Shared Channel
QoS Quality of Service
QCI QoS Class Identifier
RRC Radio Resource Control
RRH Remote Radio Heads
SCell Secondary Cell
SC-FDMA Single Carrier Frequency Division Multiple Access
SIFS Short Inter-Frame Space
SRS Sounding Reference Signal
TDD Time Division Duplexing
TL Threshold Level
UE User Equipment
Wi-Fi Wireless Fidelity
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a node of a cellular communications network, comprising:
    performing a Listen-Before-Talk, LBT, procedure for an observed channel in an unlicensed frequency spectrum, the LBT procedure comprising:
        randomly selecting a backoff counter, N;
        performing a first Clear Channel Assessment, CCA, of the observed channel for an initial CCA duration, $T_0$;
        upon determining that the observed channel is idle during the first CCA, performing a CCA of the observed channel for N additional CCA durations, $T_1$, different from $T_0$, after which the LBT procedure will be complete; and
        deferring performance of a CCA of the observed channel during at least one of the N additional CCA durations, $T_1$, such that the LBT procedure resumes or concludes at or near a point having a desired position relative to a subframe boundary, wherein the backoff counter, N, is not decremented while a CCA is being postponed; and
    performing the transmission on the observed channel upon completion of the LBT procedure.

2. The method of claim 1 wherein performing the LBT procedure comprises, for each CCA of the at least one of the N additional CCA durations, $T_1$, that is deferred by the LBT procedure, deferring performance of the CCA to a next desired CCA starting point of a plurality of desired CCA starting points.

3. The method of claim 2 wherein the plurality of desired CCA starting points are predefined relative to subframe boundaries.

4. The method of claim 2 wherein the plurality of desired CCA starting points are at or near subframe boundaries.

5. The method of claim 2 wherein the plurality of desired CCA starting points are subframe boundaries.

6. The method of claim 2 wherein the plurality of desired CCA starting points are a predefined number of symbol periods before subframe boundaries.

7. The method of claim 2 wherein the plurality of desired CCA starting points are a predefined number of symbol periods after subframe boundaries.

8. The method of claim 1 wherein performing the LBT procedure comprises, for each CCA of the at least one of the N additional CCA durations, $T_1$, that is deferred by the LBT procedure, deferring performance of the CCA to a predefined time relative to a subsequent subframe boundary.

9. The method of claim 1 wherein the at least one of the N additional CCA durations, $T_1$, comprises a first CCA slot of the LBT procedure.

10. The method of claim 1 wherein the at least one of the N additional CCA durations, $T_1$, comprises one or more intermediate CCA durations, $T_1$, of the LBT procedure.

11. The method of claim 1 wherein the at least one of the N additional CCA durations, $T_1$, comprises a final CCA duration, $T_1$, of the LBT procedure.

12. The method of claim 1 wherein the transmission is a data transmission, and performing the LBT procedure further comprises:
upon determining that the observed channel is busy during the first CCA, deferring performance of a next CCA to a next desired CCA starting point; and
observing the observed channel during the next CCA having the initial CCA duration, $T_0$, starting at the next desired CCA starting point.

13. The method of claim 12 wherein performing the LBT procedure further comprises, upon determining that the observed channel is idle during the first CCA:
observing the observed channel during an additional CCA having the CCA duration, $T_1$; and
upon determining that the observed channel is busy during the additional CCA duration, $T_1$, deferring performance of a next CCA to a next desired CCA starting point.

14. The method of claim 1 wherein the transmission is a data transmission, and performing the LBT procedure further comprises:
performing an extended CCA procedure until the backoff counter, N, is equal to 1;
upon the backoff counter, N, reaching a value of 1, making a decision as to whether performance of a last CCA of the extended CCA procedure should be deferred in order for the extended CCA procedure, and thus the LBT procedure, to conclude at or near a desired starting point for the data transmission; and
if the decision is made to defer performance of the last CCA, deferring a start of the last CCA to a next desired CCA starting point.

15. The method of claim 1 wherein the transmission is a data transmission, and performing the LBT procedure further comprises:
performing an extended CCA procedure until the backoff counter, N, is equal to 2;
upon the backoff counter, N, reaching a value of 2, observing the observed channel during a CCA having an extended CCA duration, $T_3$; and
upon determining that the observed channel is busy during the CCA having the extended CCA duration, $T_3$, deferring a next CCA to a next desired CCA starting point.

16. The method of claim 1 wherein the transmission is a data transmission, and performing the LBT procedure further comprises:
performing an extended CCA procedure until the backoff counter, N, is equal to 2;
upon the backoff counter, N, reaching a value of 2, making a decision as to whether performance of a next CCA of the extended CCA procedure should be deferred in order for the extended CCA procedure, and thus the LBT procedure, to conclude at or near a desired starting point for the data transmission; and
if the decision is made to defer the next CCA, deferring a start of the next CCA to a next desired CCA starting point.

17. The method of claim 16 wherein performing the LBT procedure further comprises, if the decision is made to not defer performance of the next CCA:
observing the observed channel during a CCA having an extended CCA duration, $T_3$; and
upon determining that the observed channel is busy during performance of the CCA having the extended CCA duration, $T_3$, repeating the step of making a decision as to whether performance of a next CCA of the extended CCA procedure should be deferred in order for the extended CCA procedure, and thus the LBT procedure, to conclude at or near a desired starting point for the data transmission.

18. The method of claim 1 wherein the transmission is a control or management transmission, and performing the LBT procedure comprises:
observing the observed channel during the first CCA duration, $T_0$;
upon determining that the observed channel is busy during an additional CCA duration, $T_1$, making a decision as to whether performance of ta next CCA should be deferred in order for the LBT procedure to conclude at or near a desired starting point for the control or management transmission; and
if the decision is made to defer performance of the next CCA, deferring a start of the next CCA to a next desired CCA starting point.

19. The method of claim 1 wherein the transmission is a control or management transmission, and performing the LBT procedure comprises:
making a decision as to whether performance of the first CCA should be deferred in order for the LBT procedure to conclude at or near a desired starting point for the control or management transmission; and
if the decision is made to defer performance of the first CCA slot, deferring a start of the first CCA to a next desired CCA starting point.

20. The method of claim 19 wherein performing the LBT procedure further comprises:
observing the observed channel during the first CCA; and
upon determining that the observed channel is busy during the first CCA, performing an extended CCA procedure until the backoff counter, N, is equal to 0.

21. The method of claim 1 wherein the transmission is a control or management transmission, and performing the LBT procedure comprises:
observing the observed channel during the first CCA;
upon determining that the observed channel is busy during an additional CCA, making a decision as to whether performing a next CCA should be deferred in order for the LBT procedure to conclude at or near a desired starting point for the control or management transmission;

if the decision is made to defer performance of the next CCA, deferring a start of the next CCA to a next desired CCA starting point; and whether or not the decision is made to defer performance of the next CCA, performing an extended CCA procedure until the backoff counter, N, is equal to 0.

22. The method of claim 1 wherein the transmission is a control or management transmission, and performing the LBT procedure comprises:

making a decision as to whether performance of the first CCA should be deferred in order for the LBT procedure to conclude at or near a desired starting point for the control or management transmission;

if the decision is made to defer performance of the first CCA, deferring a start of the first CCA to a next desired CCA starting point;

whether or not the decision is made to defer performance of the first CCA, observing the observed channel during the first CCA duration, $T_0$; and upon determining that the observed channel is busy during the first CCA duration $T_0$, performing an extended CCA procedure until the backoff counter, N, is equal to 0;

wherein performing the extended CCA procedure comprises:

observing the observed channel during an additional CCA duration, $T_1$;

upon determining that the observed channel is busy during the additional CCA, making a decision as to whether performance of a next CCA of the extended CCA procedure should be deferred in order for the extended CCA procedure, and thus the LBT procedure, to conclude at or near a desired starting point for the control or management transmission; and if the decision is made to defer performance of the next CCA, deferring a start of the next CCA to a next desired CCA starting point.

23. The method of claim 1 wherein the node supports multi-carrier transmission, the observed channel in the unlicensed frequency spectrum is for a first carrier, and performing the LBT procedure comprises:

for each carrier of a plurality of carriers for multi-carrier operation including the first carrier and one or more additional carriers, performing a LBT procedure for an observed channel for the carrier and an unlicensed frequency spectrum, the LBT procedure deferring performance of at least one CCA such that the LBT procedure concludes at or near a desired starting point for a transmission on the carrier in the observed channel, the at least one CCA comprising at least one of a first CCA of the LBT procedure, one or more intermediate CCAs of the LBT procedure, and a final CCA of the LBT procedure.

24. The method of claim 1 wherein the node supports multi-carrier transmission, the observed channel in the unlicensed frequency spectrum is for a first carrier, and performing the LBT procedure comprises:

performing a coordinated LBT procedure, with CCA deferral, for multiple observed channels on multiple carriers for multi-carrier operation comprising the first carrier and one or more additional carriers such that the coordinated LBT procedure concludes at or near a desired starting point for transmissions on the multiple carriers.

25. The method of claim 1 wherein the node supports multi-carrier transmission, the observed channel in the unlicensed frequency spectrum is for a first carrier, and the method further comprises performing a LBT procedure for a second observed channel for a second carrier in an unlicensed frequency spectrum, the LBT procedure for the second observed channel comprising:

deferring the start of a CCA for observation of the second observed channel such that the CCA for observation of the second observed channel is aligned with a final CCA of the LBT procedure for the observed channel for the first carrier.

26. The method of claim 1 further comprising:

configuring one or more settings for the LBT procedure based on a quality of service class of an associated bearer;

wherein performing the LBT procedure comprises performing the LBT procedure using the one or more settings.

27. The method of claim 1 wherein at least some CCAs of the LBT procedure are of different durations.

28. The method of claim 1 wherein the node is a wireless device, and the method further comprises receiving a configuration of one or more LBT settings for the LBT procedure from a network node.

29. The method of claim 1 wherein the node is a radio access node.

30. The method of claim 1 wherein the node is a wireless device.

31. The method of claim 1 wherein the node is a Licensed Assisted Access, node.

32. The method of claim 1 wherein the node is a Long Term Evolution Unlicensed, LTE-U, node.

33. The method of claim 1 wherein deferring performance of at least one of the N additional CCA durations, $T_1$, comprises deferring at least one of a first one of the N additional CCA durations, $T_1$, a last one of the N additional CCA durations, $T_1$, and at least one of the N additional CCA durations, $T_1$, other than the first or last one of the N additional CCA durations, $T_1$.

34. A node of a cellular communications network, comprising:

a wireless transceiver;
at least one processor; and
memory containing software instructions executable by the at least one processor, whereby the node is operable to:

perform a Listen-Before-Talk, LBT, procedure for an observed channel in an unlicensed frequency spectrum, the LBT procedure comprising:

randomly selecting a backoff counter, N;

performing a first Clear Channel Assessment, CCA, of the observed channel for a first CCA duration, $T_0$;

upon determining that the observed channel is idle during the first CCA, performing a CCA of the observed channel for N additional CCA durations, $T_1$, different from CCA duration, $T_0$, after which the LBT procedure will be complete; and deferring performance of a CCA of the observed channel during at least one of the N additional CCA durations, $T_1$ such that the LBT procedure resumes or concludes at or near a point having a desired position relative to a subframe boundary, wherein the backoff counter, N, is not decremented while a CCA is being postponed; and perform the transmission on the observed channel upon completion of the LBT procedure.

35. The node of claim 34 wherein deferring at least one of the N additional CCA durations, $T_1$, comprises deferring at least one of a first one of the N additional CCA durations, $T_1$, a last one of the N additional CCA durations, $T_1$, and at least one of the N additional CCA durations, $T_1$ other than the first or last one of the N additional CCA durations, $T_1$.

\* \* \* \* \*